US012470032B2

(12) United States Patent
White et al.

(10) Patent No.: US 12,470,032 B2
(45) Date of Patent: Nov. 11, 2025

(54) POWER TOOL WITH CRIMP LOCALIZATION

(71) Applicant: Hubbell Incorporated, Shelton, CT (US)

(72) Inventors: Brian McCulloh White, Manchester, NH (US); David Compton Heck, Amherst, NH (US); Michael Anthony Guarrera, Amherst, NH (US); John David Lefavour, Litchfield, NH (US); Michael James Hennings, Wellington, FL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/120,891

(22) Filed: Mar. 13, 2023

(65) Prior Publication Data

US 2023/0216261 A1 Jul. 6, 2023

Related U.S. Application Data

(63) Continuation of application No. 16/589,001, filed on Sep. 30, 2019, now Pat. No. 11,621,531.

(60) Provisional application No. 62/738,760, filed on Sep. 28, 2018.

(51) Int. Cl.
*H01R 43/042* (2006.01)
*H01R 43/048* (2006.01)

(52) U.S. Cl.
CPC ..... *H01R 43/0427* (2013.01); *H01R 43/0486* (2013.01)

(58) Field of Classification Search
CPC ........................ H01R 43/0486; H01R 43/0427
See application file for complete search history.

(56) References Cited

U.S. PATENT DOCUMENTS

| | | | | |
|---|---|---|---|---|
| 5,113,679 | A | 5/1992 | Ferraro et al. | |
| 5,152,162 | A * | 10/1992 | Ferraro .............. | H01R 43/0486 72/21.5 |
| 5,195,042 | A | 3/1993 | Ferraro et al. | |
| 5,490,406 | A | 2/1996 | College | |

(Continued)

FOREIGN PATENT DOCUMENTS

| | | |
|---|---|---|
| CN | 101044005 | 9/2007 |
| CN | 107743427 | 2/2018 |

(Continued)

OTHER PUBLICATIONS

Translation of CN-111200227-A (Year: 2020).*

(Continued)

*Primary Examiner* — Jeffrey T Carley
(74) *Attorney, Agent, or Firm* — Wissing Miller LLP

(57) ABSTRACT

Portable, hand-held, battery operated, hydraulic tools are provided with a tool frame, a force sensor, and a location detector. A piston actuated by a hydraulic system within the tool frame applies force to the working head to perform a task, such as to apply a crimp to an electrical connector. The tool determines the maximum force applied to the crimp and records that maximum force along with the geographic location of the tool when the crimp was formed. The maximum force provides an indication of the quality of the crimp and the recorded location allows a potentially defective crimp to be located.

14 Claims, 14 Drawing Sheets

(56) References Cited

U.S. PATENT DOCUMENTS

| | | | |
|---|---|---|---|
| 5,553,478 A | 9/1996 | Di Troia | |
| 5,657,417 A | 8/1997 | Di Troia | |
| 5,678,982 A | 10/1997 | Schwaiger | |
| 5,829,289 A | 11/1998 | Fisher | |
| 5,901,440 A | 5/1999 | Maeda et al. | |
| 5,961,561 A | 10/1999 | Wakefield, II | |
| 5,966,806 A | 10/1999 | Maeda et al. | |
| 6,315,062 B1 | 11/2001 | Alft | |
| 6,369,560 B1 | 4/2002 | Nghiem | |
| 6,418,769 B1 | 7/2002 | Schreinder | |
| 6,431,289 B1 | 8/2002 | Potter | |
| 6,526,853 B2 | 3/2003 | Jenkins | |
| 6,607,041 B2 | 8/2003 | Suzuki et al. | |
| 6,745,611 B2 | 6/2004 | Lefavour | |
| 6,957,560 B2 | 10/2005 | Lefavour et al. | |
| 7,181,942 B2 | 2/2007 | Yost | |
| 7,346,422 B2 | 3/2008 | Tsuchiya | |
| 7,487,654 B2 | 2/2009 | Lefavour | |
| 7,493,791 B2 | 2/2009 | Chadourne | |
| 7,608,790 B2 | 10/2009 | Patton | |
| 7,613,590 B2 | 11/2009 | Brown | |
| RE41,160 E | 3/2010 | Gilmore et al. | |
| 7,750,811 B2 | 7/2010 | Puzio | |
| 7,823,433 B2 | 11/2010 | Zhang | |
| 7,832,638 B2 | 11/2010 | Wetzel | |
| 7,942,211 B2 | 5/2011 | Scrimshaw | |
| 7,954,232 B2 | 6/2011 | Huang | |
| 8,077,026 B2 | 12/2011 | Jobe | |
| 8,079,242 B2 | 12/2011 | Pacaud | |
| 8,084,981 B2 | 12/2011 | Miwa | |
| 8,089,247 B2 | 1/2012 | Pellenc | |
| 8,095,340 B2 | 1/2012 | Brown | |
| 8,210,273 B2 | 7/2012 | Suzuki | |
| 8,224,256 B2 | 7/2012 | Citrano | |
| 8,260,452 B2 | 9/2012 | Austin | |
| 8,310,544 B2 | 11/2012 | Kim | |
| 8,406,697 B2 | 3/2013 | Arimura | |
| 8,412,179 B2 | 4/2013 | Gerold | |
| 8,517,558 B2 | 8/2013 | Oomori et al. | |
| 8,570,536 B2 | 10/2013 | Kelly | |
| 8,579,043 B2 | 11/2013 | Hirayama | |
| 8,692,649 B2 | 4/2014 | Clevenger | |
| 8,766,794 B2 | 7/2014 | Ferguson | |
| 8,903,643 B2 | 12/2014 | Nielsen | |
| 8,919,456 B2 | 12/2014 | Ng | |
| 8,978,263 B2 | 3/2015 | Nahum | |
| 9,073,394 B1 | 7/2015 | Clasquin | |
| 9,156,148 B2 | 10/2015 | King | |
| 9,174,752 B2 | 11/2015 | Neeser | |
| 9,210,581 B2 | 12/2015 | Toepke | |
| 9,233,457 B2 | 1/2016 | Wanek | |
| 9,256,220 B1 | 2/2016 | Coffland | |
| 9,256,988 B2 | 2/2016 | Wenger | |
| 9,367,062 B2 | 6/2016 | Volpert | |
| 9,373,015 B2 | 6/2016 | Swenson | |
| 9,430,928 B2 | 8/2016 | Ikeda | |
| 9,466,198 B2 | 10/2016 | Burch | |
| 9,467,862 B2 * | 10/2016 | Zeiler | H04W 4/021 |
| 9,555,537 B2 | 1/2017 | Iwata | |
| 9,559,755 B2 | 1/2017 | Breitenbach et al. | |
| 9,575,091 B2 | 2/2017 | Reeder | |
| 9,591,228 B2 | 3/2017 | Cisi | |
| 9,595,839 B2 | 3/2017 | Furui | |
| 9,652,217 B2 | 5/2017 | Winkler | |
| 9,700,997 B2 | 7/2017 | Schlegel et al. | |
| 9,756,402 B2 | 9/2017 | Stampfl | |
| 9,766,608 B2 | 9/2017 | Wuertele | |
| 9,776,309 B2 | 10/2017 | Fluhrer | |
| 9,783,936 B2 | 10/2017 | Gareis | |
| 9,799,929 B2 * | 10/2017 | Kawase | H01M 50/204 |
| 9,808,918 B2 | 11/2017 | Lawton | |
| 9,813,110 B2 | 11/2017 | Glauning | |
| 9,817,839 B2 | 11/2017 | Kahle | |
| 9,819,132 B2 | 11/2017 | Peloquin | |
| 9,878,432 B2 | 1/2018 | Linehan | |
| 9,888,300 B2 | 2/2018 | Stampfl | |
| 9,900,967 B2 | 2/2018 | Isaacs | |
| 9,940,813 B2 | 4/2018 | Nishikawa | |
| 2004/0267419 A1 * | 12/2004 | Jeng | B60R 1/12 455/426.2 |
| 2008/0300580 A1 | 12/2008 | Shelton et al. | |
| 2009/0251330 A1 * | 10/2009 | Gerold | B25C 1/08 455/466 |
| 2012/0169485 A1 | 7/2012 | Eckert | |
| 2012/0314226 A1 | 12/2012 | Kelly | |
| 2013/0138465 A1 * | 5/2013 | Kahle | G06Q 10/063114 705/7.17 |
| 2013/0153250 A1 | 6/2013 | Eckert | |
| 2013/0233043 A1 | 9/2013 | Kelly | |
| 2013/0277078 A1 | 10/2013 | Wallgren | |
| 2014/0001224 A1 | 1/2014 | McNeill | |
| 2014/0005820 A1 | 1/2014 | Roehm | |
| 2014/0008088 A1 | 1/2014 | Chellew | |
| 2014/0107853 A1 | 4/2014 | Ashinghurst | |
| 2014/0180464 A1 | 6/2014 | Koerber | |
| 2014/0240125 A1 | 8/2014 | Burch et al. | |
| 2015/0101186 A1 | 4/2015 | Kelly | |
| 2015/0136829 A1 | 5/2015 | Howes | |
| 2015/0253766 A1 | 9/2015 | Pettersson | |
| 2015/0263472 A1 | 9/2015 | Sneath | |
| 2015/0286209 A1 | 10/2015 | Kreuzer | |
| 2015/0289152 A1 | 10/2015 | Shanmugam et al. | |
| 2015/0316913 A1 | 11/2015 | Rickey | |
| 2015/0367497 A1 | 12/2015 | Ito | |
| 2015/0375388 A1 | 12/2015 | Ullrich | |
| 2016/0016222 A1 | 1/2016 | Bungter | |
| 2016/0048122 A1 | 2/2016 | Lukosz | |
| 2016/0104994 A1 | 4/2016 | Cramer | |
| 2016/0126543 A1 * | 5/2016 | Ota | H01M 4/587 |
| 2016/0178398 A1 | 6/2016 | Krapf | |
| 2016/0252909 A1 * | 9/2016 | Webber | G05D 1/0891 701/41 |
| 2016/0311094 A1 | 10/2016 | Mergener | |
| 2016/0342142 A1 | 11/2016 | Boeck | |
| 2016/0342151 A1 | 11/2016 | Dey | |
| 2016/0354889 A1 | 12/2016 | Ely | |
| 2016/0354905 A1 | 12/2016 | Ely | |
| 2016/0363510 A1 | 12/2016 | Kanack | |
| 2016/0364687 A1 | 12/2016 | Matson | |
| 2016/0373457 A1 | 12/2016 | Matson | |
| 2016/0375570 A1 | 12/2016 | Boeck | |
| 2017/0008159 A1 | 1/2017 | Boeck | |
| 2017/0028536 A1 | 2/2017 | Lefavour | |
| 2017/0057040 A1 | 3/2017 | Rzasa | |
| 2017/0110006 A1 | 4/2017 | Yamamoto | |
| 2017/0153631 A1 | 6/2017 | Jonsson | |
| 2017/0162035 A1 | 6/2017 | Kusakawa | |
| 2017/0173751 A1 | 6/2017 | Stock | |
| 2017/0173768 A1 | 6/2017 | Dey | |
| 2017/0174374 A1 | 6/2017 | Figiel | |
| 2017/0180536 A1 | 6/2017 | Stock | |
| 2017/0190041 A1 | 7/2017 | Dey | |
| 2017/0199509 A1 | 7/2017 | Khalaf | |
| 2017/0201853 A1 | 7/2017 | Chen | |
| 2017/0216986 A1 | 8/2017 | Dey | |
| 2017/0269167 A1 | 9/2017 | Willey | |
| 2017/0302044 A1 | 10/2017 | Lefavour et al. | |
| 2017/0317460 A1 | 11/2017 | Broker | |
| 2017/0353041 A1 | 12/2017 | Klee | |
| 2017/0353847 A1 | 12/2017 | Coulis | |
| 2018/0054033 A1 | 2/2018 | Skonieczny | |
| 2018/0160266 A1 | 6/2018 | Burch et al. | |
| 2018/0161969 A1 | 6/2018 | Rosani | |
| 2019/0160643 A1 * | 5/2019 | Lefavour | B25F 3/00 |
| 2019/0173252 A1 | 6/2019 | Weber et al. | |

FOREIGN PATENT DOCUMENTS

| | | | | |
|---|---|---|---|---|
| CN | 111200227 A * | 5/2020 | H01R 43/0421 |
| EP | 2809482 B1 * | 11/2018 | B21D 31/04 |
| JP | 20180108633 A | 7/2018 | |
| WO | 2016165869 | 10/2016 | |
| WO | 2016198973 | 12/2016 | |

(56) References Cited

FOREIGN PATENT DOCUMENTS

| | | | | |
|---|---|---|---|---|
| WO | 2016203315 | | 12/2016 | |
| WO | 2016206860 | | 12/2016 | |
| WO | WO-2016198973 | A1 * | 12/2016 | ........... B23D 29/002 |
| WO | 2017027446 | | 2/2017 | |
| WO | 2017035518 | | 3/2017 | |
| WO | 2017045980 | | 3/2017 | |
| WO | 2017089100 | | 6/2017 | |
| WO | 2017102514 | | 6/2017 | |
| WO | 2017167783 | | 10/2017 | |
| WO | 2017190975 | | 11/2017 | |
| WO | 2017215996 | | 12/2017 | |
| WO | 2018050415 | | 3/2018 | |

OTHER PUBLICATIONS

Greenlee Tools, Inc, Next Generation Tools, Brochure MA6568 rev 08/18, 2018, Rockford, IL (48 pages).

International Search Report and Written Opinion mailed in corresponding PCT/US2019/053910 on Feb. 12, 2019 (10 pages).

International Preliminary Report on Patentability issued in coorresponding PCT/US2019/053910 on Mar. 23, 2021 (8 pages).

EP Communication pursuant to Rule 70(2) and 70a(2) EPC mailed in EP 1965300.8 on May 20, 2022 (8 pages).

First Office Action mailed in Chinese application 20190071063.7 on Jan. 5, 2023.

Second Office Action mailed in Chinese application 20190071063.7 on May 27, 2023.

Rejection Decision mailed in Chinese application 20190071063.7 on Aug. 31, 2023.

Low-voltage Electrical Safety, Hongchou Fu et al., Standards Press of China, Feb. 1994, ISBN: 7-5066-0602-X.

Communication pursuant to Article 94(3) EPC in corresponding European Application No. 19865300.8 mailed Jul. 15, 2024. (6 pages).

* cited by examiner

| Index # | Pressure (K PSI) | Latitude | Longitude | Altitude | Date | Time | Flag | Comment |
|---|---|---|---|---|---|---|---|---|
| 1 | 10.750 | 41.0165248 | -74.1137584 | 100.6 | 01/15/18 | 12:32 pm | | crimp failed - user error |
| 2 | 10.980 | 41.06 | | 101.5 | 01/15/18 | 12:40 pm | | |
| | | | | | | | | |

*Fig. 8*

POWER TOOL WITH CRIMP LOCALIZATION

CROSS REFERENCE TO RELATED APPLICATIONS

The present disclosure is a continuation of U.S. Nonprovisional patent application Ser. No. 16/589,001 filed Sep. 30, 2019, now U.S. Pat. No. 11,621,531 issued Apr. 4, 2023 and claims benefit from U.S. Provisional Patent Application Ser. No. 62/738,760 filed on Sep. 28, 2018 entitled "Power Tool with Crimp Localization" the contents of which are incorporated herein in their entirety by reference.

BACKGROUND

Field

The present disclosure relates to power tools that can monitor and record the maximum force applied to deform a workpiece to form a crimp connection and record the geographic location of the tool when the crimp is formed. Individual crimps can be commented with a text field to further locate the crimps. The present disclosure is also related to mapping data showing the geographic location of crimps formed using such a power tool.

Description of the Related Art

Portable, handheld power tools are used to perform a variety of tasks. Such tools include a power source such as a battery, an electric motor, and a working component, such as a saw, cutting blade, grinding wheel, or crimper. Some portable tools incorporate a hydraulic pump to drive a piston to apply a relatively large amount of force or pressure for a particular task. Some of these hydraulic tools include a working head with working surfaces shaped to perform a particular action on a workpiece, for example, to deform a crimp connector onto the surface of a conductor to form a crimped connection. To make such connection a connector is fitted over the conductor. The connector is placed between the working surfaces of the tool. Force from the piston actuated by the hydraulic system closes the working surfaces onto the connector, pressing it against the conductor and plastically deforming both the connector and the conductor to create a stable mechanical and electrical connection.

Sufficient force needs to be applied to deform the connector around the strands of the conductor. Otherwise, the connection may not be mechanically stable or may introduce excessive electrical resistance when current flows through the conductor. This resistance may lead to heating of the conductor and the potential for a fire. Known hydraulic crimping tools include systems for measuring the maximum force applied to the workpiece.

SUMMARY

The present disclosure provides exemplary embodiments of hydraulic power tools with a tool frame and working head adapted to form crimp connections, to monitor the force applied when a crimp is formed, to determine a geographic location of the tool when the crimp connection is formed, and to record the force and location information. Comments may be added to each crimp record that can be used to locate where crimps are formed. The recorded force and location information allow the tool manager, tool user or other parties to review the quality of the crimp connections formed using the tool.

The disclosure is not limited to hydraulic crimping tool, but also include mechanical tools used to form crimps that are adapted to determine and record their geographic location.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 8 is a table illustrating an exemplary embodiment of a data structure for storing force data, location data and time stamp data according to the present disclosure;

DETAILED DESCRIPTION

Figure 1:
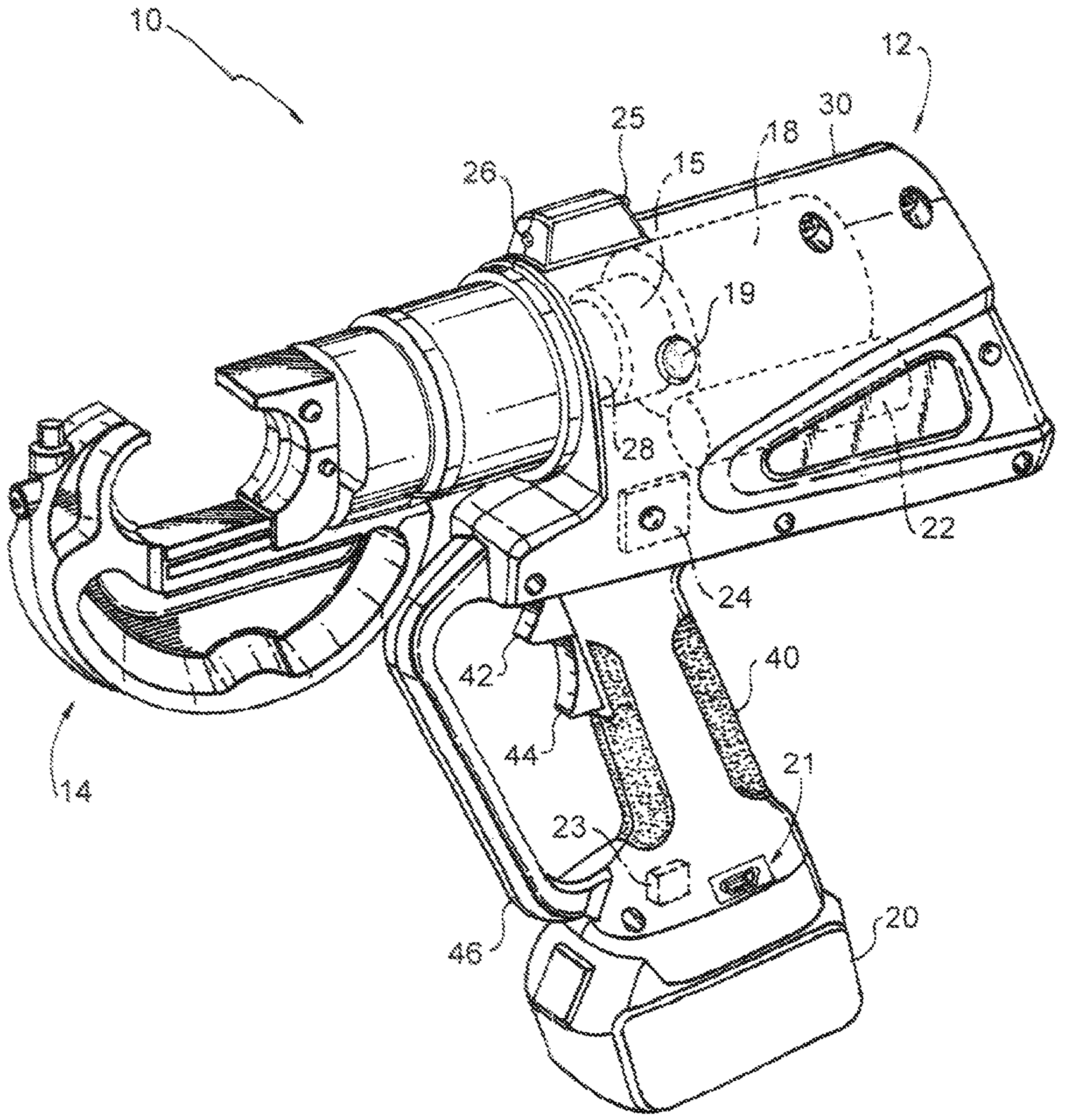
FIG. 1 is a front perspective view of an exemplary embodiment of a tool according to the present disclosure.

Exemplary embodiments of the present disclosure may be provided as improvements to portable, hand-held, battery operated, hydraulic tools for forming crimps and other electrical connections, and for monitoring and recording crimp information. The crimp information contemplated by the present disclosure includes, but is not limited to, the type and size of the workpiece to be crimped, a force applied by the tool to form the crimp, a time stamp when the crimp was formed, a location of the tool when the crimp was formed, status of the crimp, a data flag setting, alpha-numeric information associated with the flag, and other alpha-numeric information associated with the crimp. The workpieces contemplated by the present disclosure include, but are not limited to, lug connectors, splice connectors and other wire terminations. The time stamps contemplated by the present disclosure include, but are not limited to, the time of day the crimp was formed, the day the crimp was formed and the year the crimp was formed or a combination thereof.

Turning to the figures, FIGS. 1-4 show an exemplary embodiment of a hydraulic power tool 10 according to the present disclosure. The tool 10 includes a tool frame 12 and a working head 14. The tool frame 12 includes a main body 30 and a handle 40 that form a pistol-like shape. However, the tool frame 12 could be in any suitable type of shape. Within the main body 30 of the tool frame 12 is a battery driven hydraulic and control system 11 illustrated schematically in FIG. 2. The hydraulic and control system 11 includes a hydraulic system and a control system. In the exemplary embodiment shown, the hydraulic system includes a motor 18, a gear reduction box 48, a pump 15, a hydraulic fluid reservoir 22, a hydraulic drive 28 and a relief valve 29. In the exemplary embodiment shown, the control system includes a battery 20, a controller 24, memory 32, one or more operator controls 42 and 44, a communication port 21, a location system 23, a stroke sensor 16, a force sensor 27, a flag switch 19, a status indicator 25 and a work light 26.

The battery 20 provides power to the controller 24. The battery 20 also provides power to the motor 18 under the control of controller 24 and the operator controls 42 and 44. The motor 18 drives the pump 15 via gear reduction box 48. The pump 15 is in fluid communication with the hydraulic fluid reservoir 22. When driven by the motor 18, the pump 15 delivers fluid under pressure from reservoir 22 to the hydraulic drive 28. Force generated by hydraulic drive 28 is delivered via a piston 60, seen in FIG. 4, to the working head 14, as described below. The force sensor 27 is provided to measure the force applied to a workpiece as described below. Non-limiting examples of the force sensor 27 include pressure sensors or transducers, load cells, strain gauges and other force measuring devices. In the exemplary embodiment of the tool 10 described herein, the force sensor 27 is a pressure sensor. The pressure sensor 30 is connected to the hydraulic drive 28 and senses the hydraulic pressure in the hydraulic drive 28. The controller 24 receives data indicating the pressure in the hydraulic drive 28 from the pressure sensor 27 and makes a determination (or computes) of a force applied by the tool 10 on the workpiece which is described in more detail below. The controller 24 receives signals from the one or more operator controls 42, 44 to activate and deactivate the motor 18 which activates and deactivates the hydraulic drive 28, respectfully. When the controller 24 activates the motor 18, a work light 26 positioned on the main body 30 of the tool frame 12 may also be activated to illuminate an area of the working head 14 during a crimp cycle.

Figure 2:
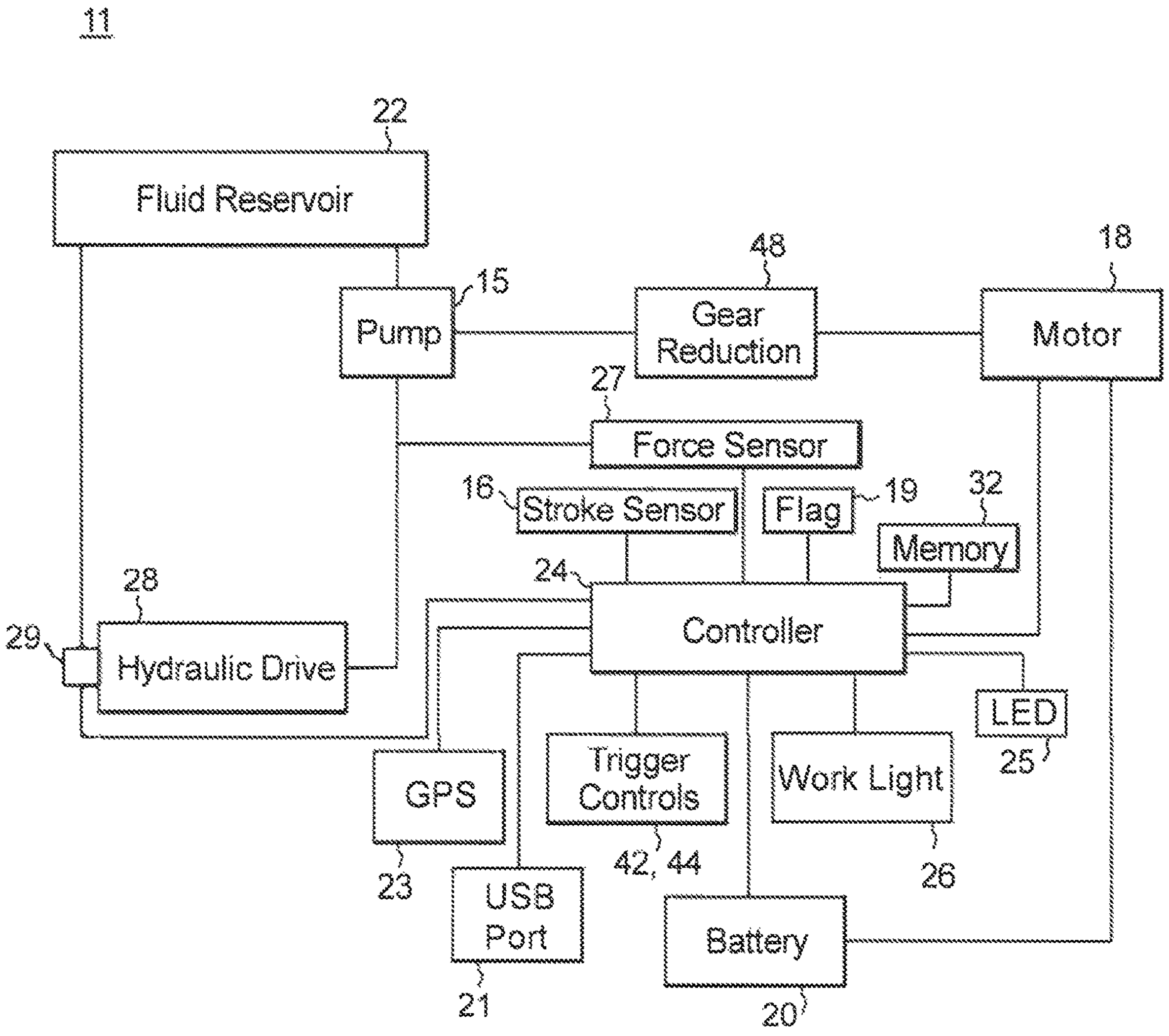
FIG. 2 is a schematic diagram illustrating a hydraulic drive and control system according to an embodiment of the disclosure.

Continuing to refer to FIG. 2, a relief valve 29 connects the hydraulic drive 28 with the fluid reservoir 22. According to one embodiment, the relief valve 29 is a mechanically actuated valve designed to open when a predetermined maximum pressure is reached in the hydraulic system. When the relief valve 29 is opened, fluid flows from the hydraulic drive 28 back to reservoir 22 relieving pressure in hydraulic drive 28 and removing the force applied on the workpiece by the piston 60. A spring (not shown) may be provided as part of hydraulic drive 28 to return the piston 60 to a home position, shown in FIG. 3, when pressure in hydraulic drive 28 is relieved. It is noted that when the relief valve 29 opens, the relief valve may make an audible indication, such as a "pop" like sound, that the relief valve 29 has opened.

The controller 24 monitors the pressure in hydraulic drive 28 to determine when a crimp cycle is complete. After actuating the motor 18 in response to activation of an operator control, e.g., trigger switch 44, the controller 24 monitors the hydraulic fluid pressure in the hydraulic system via the force sensor 27. When the relief valve 29 opens and the pressure in the hydraulic system drops below a predetermined minimum threshold, the controller 24 determines that a crimp cycle is complete. As shown in FIG. 1, an indicator light 25 is positioned on a top portion of the main body 30 of the tool frame 12 facing in the proximal direction so that it is visible to the tool user. The indicator light 25 is electrically connected to the controller 24. According to one embodiment, the light 25 is a bi-color LED that can be energized to illuminate in two distinct colors, such as red and green. However, other types of LED indicators may be used, such as a tri-colored LED capable of emitting red, green and yellow light. When the controller 24 determines that the crimp cycle is complete and that the hydraulic system has reached a predetermined threshold pressure, the controller 24 energizes light 25 to illuminate green to indicate a successful crimp. If the hydraulic system was not able to reach the predetermined threshold pressure during the crimp cycle, because, for example, there was insufficient battery power to reach the desired threshold pressure or because the pressure setting of the relief valve 29 is out of calibration, the controller 24 energizes the light 25 to illuminate red. It is noted that the present disclosure also contemplates that the controller 24 may activate a sound generating device (not shown) when the controller 24 determines that the crimp cycle is complete and that the hydraulic system has reached a predetermined threshold pressure to indicate a successful crimp.

Referring again to FIGS. 1 and 2, in this exemplary embodiment, the flag switch 19 is electrically connected to the controller 24 and permits a tool user to store a data flag along with other crimp information about a particular crimp operation in the memory 32. The flag switch 19 may be provided on the main body 30 so that a tool user can activate the flag switch 19 to set a flag in the crimp information associated with a crimp data record stored in the tool memory 32. Such a flag may be used to remind a tool manager and/or a tool user to review or insert comments into the crimp information associated with a particular crimping cycle, as will be explained below. In addition, the flag may represent that a failed crimp was noticed by the tool user.

Also electrically connected to controller 24 is a location sensor 23. The location sensor 23 may be a device to determine the location of the tool based on radio frequency signals received from a global navigation system. Non limiting examples of global navigation system include the global navigation satellite system (GNSS), such as the Global Positioning System (GPS) or the Next Generation Operational Control System (OCX) operated by the United States government, the Global Navigation Satellite System (GLONASS) operated by the Russian government, the Bei-Dou Navigation Satellite System (BNS) operated by the Chinese government, the Quasi-Zenith Satellite System (QZSS) operated by the Japanese government, the Galileo Positioning System operated by the European Union, the India Regional Navigation Satellite System (NAVIC) or the like. As an example, if the global navigation system is the GNSS, the location sensor 23 would be a GNSS antenna module, such as the SAM-M8Q module manufactured by Ublox. The location sensor 23 may be located near the surface of the handle 40 of the tool frame 12, as shown in FIG. 1, to ensure that it can receive radio frequency signals from GNSS satellites. In another exemplary embodiment, the location sensor 23 may be located near the surface of the main body 30 of the tool frame 12. The location sensor 23 may also include other means for determining a location of the tool 10, such as a receiver capable of determining location information from radio frequency sources other than global navigation systems, including cellular phone network transmissions. The present disclosure also contemplates that a separate device may be used to provide the location information associated with a crimp. For example, a tool user may use the location service on their mobile smartphone to provide the location of the crimp. To illustrate, if a tool user has their mobile smartphone paired with a tool 10 after a crimp is formed the controller 24 may ping the smartphone to provide the location information, e.g., the latitude and longitude coordinates of the smartphone, to the tool 10. The location information would then be stored in the crimp data record in memory 32 of the tool 10.

The controller 24 may be a microprocessor, microcontroller, application specific integrated circuit, field programmable gate array (FPGA) or other digital processing apparatus as will be appreciated by those skilled in the relevant art. The controller 24 communicates with memory 32 to receive program instructions and to retrieve data. Memory 32 may be read-only memory (ROM), random access memory (RAM), flash memory, and/or other types of electronic storage know to those of skill in the art. The controller 24 communicates with external devices or networks via a communication port 21, seen in FIG. 1. The communication port 21 may be physical connection, such as a USB port, a wireless communication interface, such as WiFi, Bluetooth, and the like, a removeable memory device, such as a SIM card or flash drive, or combinations thereof. Non-limiting examples of external networks include Wireless Local Area Networks (WLAN). Non-limiting examples of external devices include desktop and laptop computers, tablets, smart phones, and devices that manage networks, such as devices that manage a WLAN and is connected to multiple Communication ports 21 on different tools simultaneously. The external devices may also regularly monitor diagnostic information on the tool 10 and location information of the tool 10 and is capable of uploading this tool information to the web services 210, described below.

Continuing to refer to FIGS. 1 and 2, the battery 20 is removably connected to the bottom of the handle 40. In another embodiment, the battery 20 could be removably mounted or connected to any suitable position on the tool frame 12. In another embodiment, the battery 20 may be affixed to the tool 10 so that it is not removable. The battery 20 is preferably a rechargeable battery, such as a lithium ion battery, that can output a voltage of at least 16 VDC, and preferably in the range of between about 16 VDC and about 24 VDC. In the exemplary embodiment shown in FIG. 1, the battery 20 can output a voltage of about 18 VDC.

The handle 40 also supports the one or more operator controls, such as the trigger switches 42 and 44, which can be manually activated by a tool user. The handle 40 may include a hand guard 46 to protect a tool user's hand while operating the tool 10 and to prevent unintended operation of trigger switches 42 and 44. According to an embodiment of the present disclosure, one of the operator controls (e.g., trigger switch 44) may be used to activate the hydraulic and control system 11 while the other operator control (e.g., trigger switch 42) may be used to cause the hydraulic and control system 11 to deactivate so that the hydraulic drive 28 is depressurized.

Figure 3:
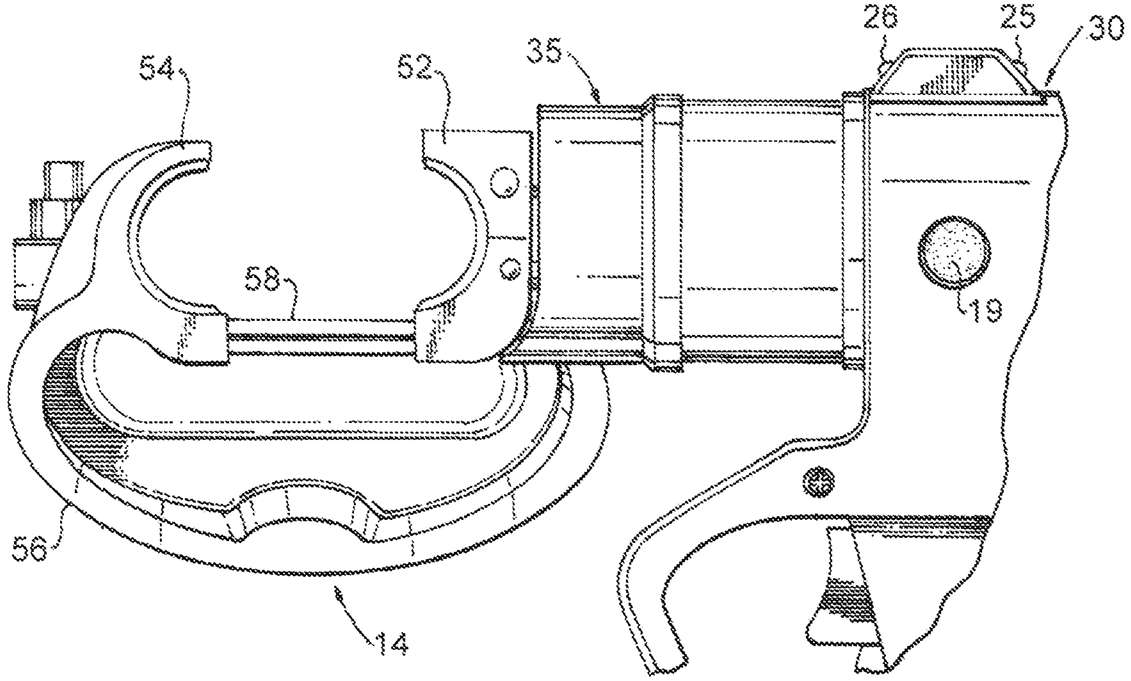
FIG. 3 is a side elevation view of a working head of the tool of FIG. 1 and a cross section of a portion of a main body of a frame of the tool of FIG. 1, illustrating a piston of the tool in a home position.
Figure 4:
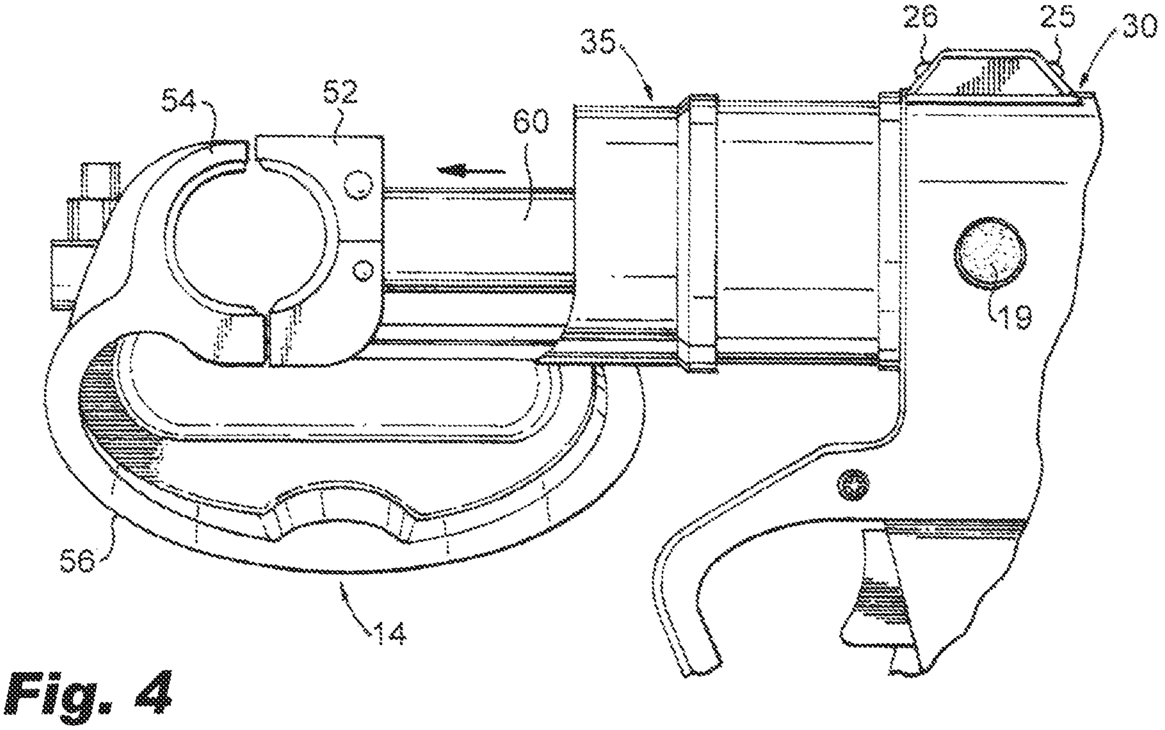
FIG. 4 is a side elevation view of the working head of the tool of FIG. 1 and a cross section of a portion of the main body of the tool of FIG. 1, illustrating the piston of the tool in an actuated position.
Figure 6:
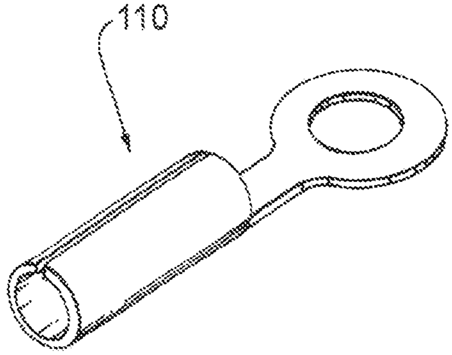
FIG. 6 is a perspective view of an exemplary embodiment of a lug connector that can be crimped using the tool of FIG. 1.
Figure 7:
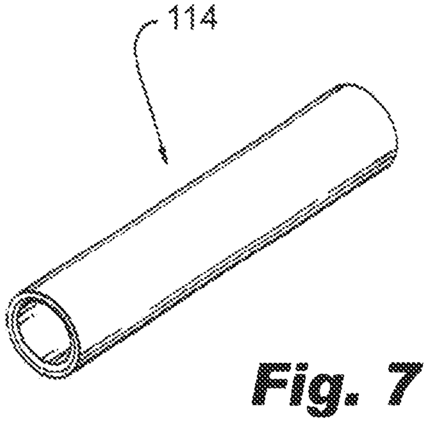
FIG. 7 is a perspective view of an exemplary embodiment of a splice connector that can be crimped using the tool of FIG. 1.

Referring now to FIGS. 1, 3 and 4 the working head 14 of the tool 10 will be described. The working head 14 includes an impactor 52, and anvil 54, an arm 56 and a guide 58. The impactor 52 is configured to move between a home position, shown in FIG. 3, and a crimping position, shown in FIG. 4. The impactor 52 is configured and dimensioned to connect to or couple with the piston 60 of the hydraulic system within the main body 30 of the tool frame 12. As described above, in an exemplary embodiment, one of the trigger switches (e.g., trigger switch 44) may be used to activate the hydraulic and control system 11 by activating the motor 18 that causes the hydraulic pump 15 to activate via the gear reduction box 48 which pressurizes the hydraulic drive 28 to drive the piston 60 in the distal direction, as shown by the arrow in FIG. 4. Driving the piston 60 distally causes the impactor 52 to move to the crimping position and deliver force to the workpiece, e.g., lug connector 110 seen in FIG. 6, or splice connector 114 seen in FIG. 7 onto a conductor. The other trigger switch (e.g., trigger switch 42) may be used to cause the hydraulic and control system 11 to deactivate so that the hydraulic drive 28 is depressurized causing the piston 60 to retract in the proximal direction to the home position, shown in FIG. 3. As noted above, a spring (not shown) may be provided as part of hydraulic drive 28 to return the piston 60 to the home position when pressure in hydraulic drive 28 is relieved. The impactor 52 is operatively coupled to the guide 58 on the arm 56 of the working head 14 so that the impactor 52 can move along the guide 58 as the piston 60 moves the impactor between the home and crimping positions. For example, when the piston 60 is driven in the distal direction, the piston moves the impactor 52 along the guide 58 from the home position, seen in FIG. 3, toward the crimping position, as shown in FIG. 4.

The arm 56 has at its proximal end a ring 35 used to connect the working head 14 to the tool frame 12, as is known. In one exemplary embodiment, the working head 14 and the frame 12 may be permanently joined with one another via the ring 35. The ring 35 has a center aperture (not shown) through which the piston 60 passes in order to connect to the impactor 52. The distal end of the arm 56 includes or forms the anvil 54. When a workpiece, such as a lug connector 110 or a splice connector 114, is placed in the working head 14 between the impactor 52 and the anvil 54, and a conductor or conductors are inserted into workpiece the motor 18 of the tool 10 can be activated so that the piston 60 is driven from the home position toward the crimping position. As the impactor 52 moves toward the anvil 54 the workpiece may also move toward the anvil. When the impactor 52 and anvil 54 both contact the workpiece further movement of the impactor 52 causes the impactor and anvil 54 to deform the workpiece thus making the crimp. It is noted, that the home position is when the impactor 52 is adjacent the ring 35 and the crimping position is when the impactor 52 and anvil 54 deform the workpiece.

To measure the force applied by the impactor 52 on the workpiece, the force sensor 27, which in this exemplary embodiment is a pressure sensor, is located in fluid communication with the hydraulic drive 28. When the piston 60 drives the impactor 52 distally until the impactor is in the crimping position, the force applied by the impactor 52 onto the workpiece is monitored by the pressure sensor 27. According to yet another embodiment of the disclosure, force sensor 27 may be located elsewhere, such as between the impactor 52 and the anvil 54, or between the impactor 52 and its die 102 or 104 to measure force applied by impactor 52 on the workpiece. According to another embodiment, the force sensor 27 may be a strain gauge mounted on arm 56 and used to measure the force applied to a workpiece.

According to one embodiment, the impactor 52 and anvil 54 may be configured and dimensioned so that when the piston 60 pressed the impactor 52 into the anvil 54 they form a crimp connection with the desired shape. According to another embodiment, the impactor 52 and/or anvil 54 may include surface features that allow die, such as the die shown in FIG. 5 to be releasably connected to the impactor 52 and the anvil 54. By using replaceable die, a variety of working surfaces can be provided on the tool to produce a variety of different shaped crimp connections. As an example, to splice two conductors together, the die 100, seen in FIG. 5, can be fitted onto the impactor 52 and the anvil 54. A splice connector, such as the one shown in FIG. 7, can be fitted onto the ends of the conductors (not shown) to be spliced. The splice connector with the conductor ends can then be placed between the die 100 and the tool 10 is actuated causing the impactor 52 with one die to move from the home position toward the crimping position. When the impactor 52 presses the splice connector against the anvil 54 with the other die, the force applied by the impactor compresses the splice connector between the die surfaces to form the crimp. To form the complete splice, multiple crimp operations may be required, depending on the configuration and dimensions of the conductor and the connector.

Figure 9:
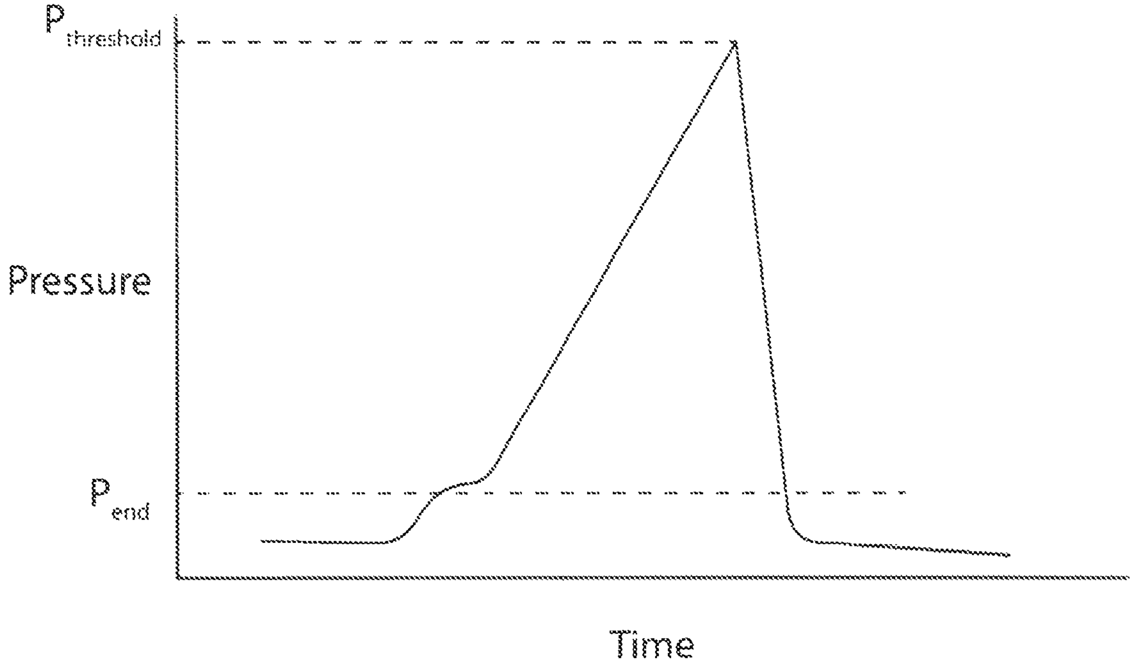
FIG. 9 is a graph illustrating pressure values generated by a tool forming a crimp connection as a function of time according to an embodiment of the present disclosure.

Referring now to FIG. 9, an illustrative example of the pressure in the hydraulic drive 28 as a function of time for a successful crimp cycle is shown. In this example, when the motor 18 is activated the pressure in the hydraulic system begins to rise and the piston 60 drives the impactor 52 toward the workpiece and the anvil 54. Once the impactor 52 contacts the workpiece pressing the workpiece against the anvil 54 and the workpiece begins to deform, the pressure in the hydraulic drive 28 rises steeply. When the pressure reaches a threshold pressure value $P_{threshold}$, the relief valve 29 opens causing the pressure in the hydraulic drive 28 to drop. When the pressure drops below a threshold minimum value $P_{end}$ the controller 24 determines that the crimp cycle is complete. Controller 24 then activates light 25 to illuminate green if $P_{threshold}$ was reached during the crimp cycle. If the pressure were to drop below $P_{end}$ without having achieved $P_{threshold}$ during the crimp cycle, the controller 24 would activate light 25 to illuminate red, indicating a potentially defective crimp connection. As a non-limiting example, the threshold minimum pressure $P_{end}$ may be about 8,500 psi and the threshold pressure $P_{threshold}$ may be about 9,000 psi. According to a further embodiment, instead of providing a mechanical relief valve 29, an electrically operated relief valve electrically connected to the controller 24 may be provided. According to this embodiment, the controller 24 monitors the pressure in the hydraulic drive 28 based on a signal from the pressure sensor 27 and opens the relief valve 29 when that pressure reaches the predetermined threshold value $P_{threshold}$ ending the crimp cycle. As in the previous embodiment, if the pressure reaches $P_{threshold}$ during the crimp cycle, the light 25 is illuminated green. If the predetermined threshold value $P_{threshold}$ cannot be reached after a predetermined period of time, e.g., 5 seconds, the controller 24 will end the crimp cycle by turning power to the motor 18 off and the controller 24 would activate light 25 to illuminate red, indicating a potentially defective crimp connection.

According to yet another embodiment, a stroke sensor 16 may be provided. The stroke sensor 16 determines when piston 60 has reached the end of its range and/or that the working surfaces of the die are at their closest approach. When the die surfaces are at their closest approach, the space defined by the surfaces of the dies forms the desired shape of the finished crimp connection. The controller 24 monitors the stroke sensor 16 and when the piston 60 is at the end of its range, the controller 24 opens the relief valve 29 completing the crimp cycle. The controller 24 may also monitor the pressure sensor 27, and as with the previous embodiments, the light 25 is illuminated either green or red, depending on whether the threshold pressure $P_{threshold}$ was reached during the crimp cycle.

According to a further embodiment, the force sensor 27 may be a load cell that monitors the force applied to the workpiece during the crimp cycle. The force measurement by the load cell 27 may be used by the controller 24 instead of (or possibly in addition to) the pressure monitored by a pressure sensor to determine whether sufficient maximum force is applied during a crimp cycle. The load cell 27 may be positioned between the impactor 52 and the anvil 54, or between the impactor 52 and its die 102 or 104.

Figure 5:
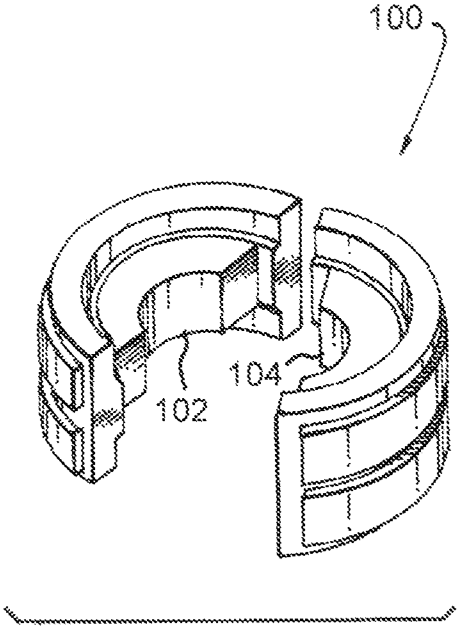
FIG. 5 is a perspective view of an exemplary embodiment of dies that can be used with a tool of FIG. 1.

In operation, a tool user selects an appropriate die, such as die 100 shown in FIG. 5, to form a desired crimp connection. The tool user selects the workpiece, which in this exemplary embodiment is a lug connector 110 or splice connector 114, for connection to a conductor. The tool user prepares the conductor, for example, by cutting it to length and removing insulation on the end to be crimped and fits the workpiece onto the conductor. The tool user places the workpiece and conductor between the faces 102 and 104 of the die 100 and presses trigger 44 to actuate the hydraulic system. More specifically, when the trigger 44 is pressed, the controller 24 turns on the motor 18 causing the pump 15 to pressurize the hydraulic drive 28 which moves piston 60 distally. Movement of the piston 60 distally moves the impactor 52 from the home position to the crimping position. When the piston 60 is in the crimping position, the impactor 52 delivers a crimping force to the workpiece so that the impactor 52 and anvil 54 deform the workpiece to crimp the conductor to the workpiece. According to one embodiment, the pressure in the hydraulic drive 28 rises as the workpiece is being deformed. When the pressure reaches the predetermined threshold value $P_{threshold}$, the relief valve 29 opens causing the pressure to drop below the minimum threshold value $P_{end}$. In response, the controller 24 determines that the crimp cycle is complete. With the crimp cycle complete, the controller 24 determines and stores the crimp information in memory 32 as a crimp data record. For example, the controller determines the geographic location where the crimp was formed based on signals from the location sensor 23. This location information may be in the form of a latitude, longitude and/or altitude where the crimp was formed. The controller 24 determines the time stamp in the form of time and date when the crimp was formed. The controller 24 also determines the maximum force that was applied to the workpiece during the crimping operation by analyzing signals received from the force sensor 27, which in this exemplary embodiment is a pressure sensor. This crimp information is then stored in memory 32 as a crimp data record, similar to that shown in FIG. 8. According to another exemplary embodiment, instead of or in addition to recording the maximum force, the controller 24 may record a series of forces or pressures applied as the crimp is formed, as shown by the graph of FIG. 9. If the tool user decides that further information about a last attempted crimp cycle should be provided, for example, because the tool user was cycling the tool without actually forming a crimp, or because the tool user determined that a crimp was faulty and replaced it with a new crimp, the tool user can activate the flag switch 19, seen in FIG. 1, causing the controller 24 to add a data flag to the crimp data record of that particular crimp operation, as seen in row 1 of FIG. 8 described below.

Referring to FIG. 8, an example of crimp data records of crimp information stored in memory 32 is shown. The crimp records are illustrated here by a table of data arranged in rows, but a variety of data structures known to those with skill in the relevant field could be used. In this embodiment, each row records crimp information for a particular crimp cycle of the tool 10. In the first column of the table an index number is stored. According to one embodiment, the index number is indicative of the particular crimp cycle performed by the tool out of the total number of cycles the tool 10 has made and serves to uniquely identify each crimp cycle recorded. The index number may also be used to determine if the tool 10 needs to be recalibrated according to a maintenance schedule. The next column records the maximum force applied or a maximum hydraulic pressure achieved by the hydraulic drive 28 during the crimp cycle. Alternatively, instead of recording a maximum force or pressure, a logical value (e.g., "Pass" or "Fail") indicating that sufficient pressure was or was not achieved during the crimp cycle could be recorded. The next columns record the location of the tool 10 when the crimp is formed, i.e., at the completion of a crimp cycle. According to one embodiment, the tool location is recorded as a latitude and longitude. According to a further embodiment, the altitude of the tool 10 may be recorded so that if the tool 10 is used a floor of a building, the floor of the building where the crimp was made can be determined by the altitude. The next two columns record the time stamp associated with when the crimp cycle was completed or activated. In the exemplary embodiment of FIG. 8, the time stamp includes the time and date when the crimp cycle was activated. The next column holds a flag that may have been added to the data record by activating the flag switch 19 following a crimp cycle. In the embodiment illustrated in FIG. 8, the first crimp data record includes a flag. For each subsequent cycle of the tool 10, a new crimp data record of crimp information is added to memory 32, as illustrated by a new row of the table. The next column holds alpha-numeric comments that may have been added to the data record by the tool user, such as "crimped failed due to user error." The present application also contemplates that the comments may include crimp location information or other information that may confirm or help with the location of crimps formed by a particular tool.

Referring now to FIGS. 10-17, the crimp information and other tool data stored in memory 32 of one or more tools 10 can be communicated or transmitted to one or more external devices 200 paired with the one or more tools 10 via the communication port 21 of each tool, seen in FIG. 1. The one or more external devices 200 may then communicate or transmit the crimp information and other tool data to a cloud based web services 210. The one or more external devices 200 and the cloud based web services 210 may form part of an overall computing system 250, seen in FIG. 10. For ease of description, the cloud based web services 210 may also be referred to herein as the "web services." Communicating the crimp information and other tool data to the external devices 200 and/or web services 210 permits tool managers and tool users to manage one or more tools 10, to manage one or more tool users and/or to manage crimps formed by the one or more tools. The external devices 200 and/or web services 210 may also regularly monitor tool diagnostic information, such as temperature information or warnings, information indicating that a particular tool is no longer detected within the computing system network, information indicating that a particular tool has repeatedly failed recent crimps, and/or cycle dwell time on the one or more tools 10 and track the location of the tool 10.

The crimp information stored in memory 32 of each tool 10 can be communicated to the external devices 200 using wireless or wired networks. A non-limiting example of a wireless network includes a Wireless Local Area Networks (WLAN) 212. Non-limiting examples of external devices 200 include desktop and laptop computers, tablets, mobile smart phones, and devices that manage networks, such as devices that can manage a WLAN that can be connected to multiple communication ports 21 on different tools 10 simultaneously.

The external devices 200 and/or web services 210 may also include operations or functions that can notify tool managers and/or tool users about pertinent changes to tools paired with or connected to the computing system 250 via a display message, a SMS text message, an email or other alert. Pertinent changes may include, but are not limited to, diagnostic information about one or more tools 10, such as temperature information or warnings, information indicating that a particular tool is no longer detected within the network, e.g., the tool is no longer detected by the WLAN, or information indicating that a particular tool has repeatedly failed recent crimps.

Referring again to FIG. 10, one such external device 200 may be a smart phone running an application (also known as an "app") used to store, display and analyze the crimp information and other tool data. Such an app may provide the tool manager and/or tool user with the ability to review one or more crimp data records and to add additional information, e.g., alpha-numeric text comments or notes, to the crimp data record of a crimp including a data flag. The external devices 200 either alone or in combination with the web services 210 may also data processing functions to analyze and display the crimp information and other tool data. These functions may include filtering crimp information to identify, for example, crimps formed at particular job sites, crimps formed between particular dates and times, or crimps where the maximum force is less than a predetermined threshold value. The data processing functions may also include generating a geographic map or a satellite based image of a geographic location showing the locations of the crimps formed by the tool 10. Filtering criteria may also be used to display only a subset of crimps, such as crimps where the maximum force applied to form the crimp was insufficient representing crimps that failed.

Figure 10:
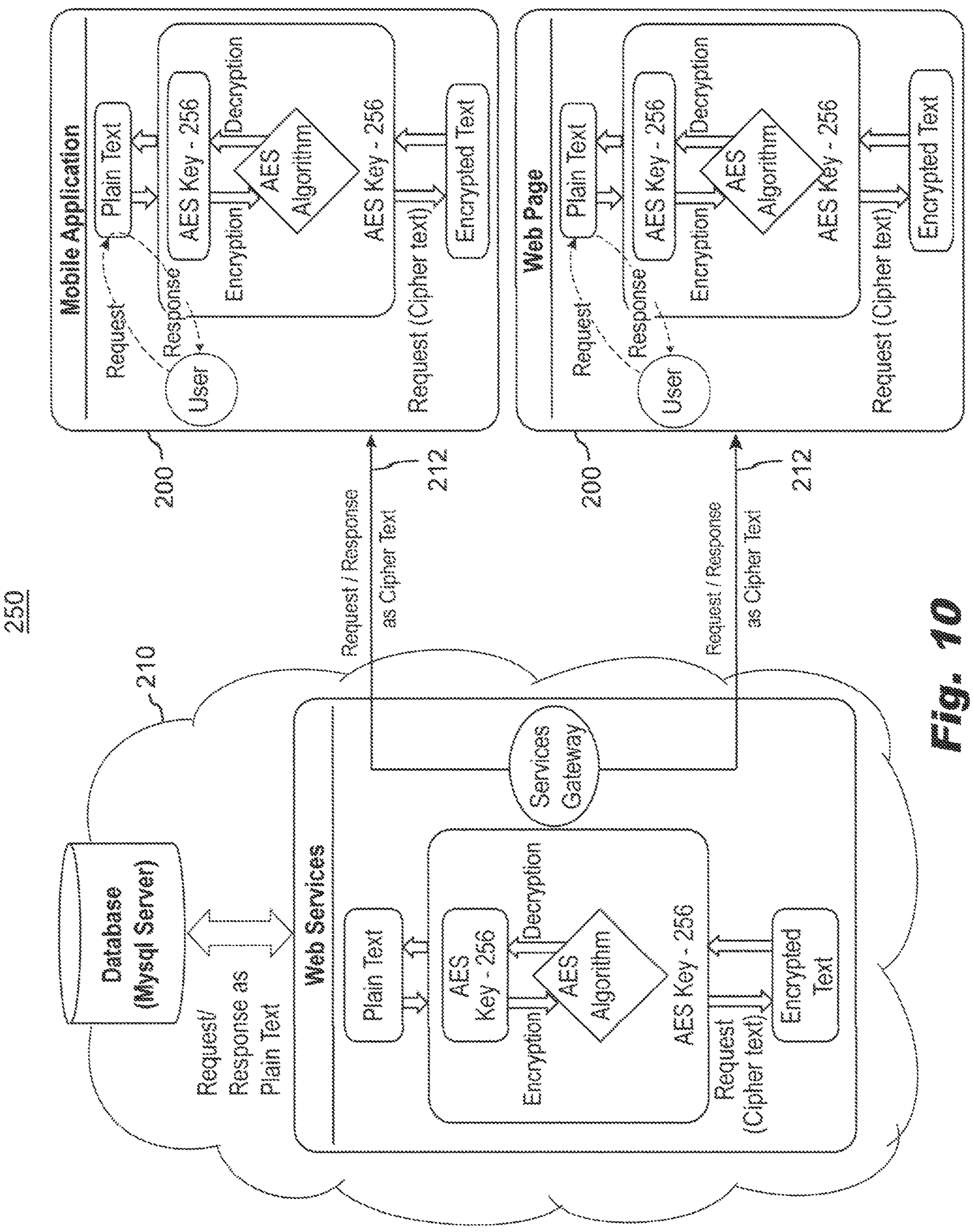
FIG. 10 is a block diagram of an exemplary embodiment of a computing system according to the present disclosure.

In the exemplary embodiment of a computing system 250 shown in FIG. 10 the computing system 250 includes cloud based web services 210, such as the AWS provided by Amazon.com Inc., a mobile smartphone 200 running a mobile app connected to a tool management application running on the web services 210 and a laptop computer 200 running a browser connected to the tool management application running on the web services 210. When the tool 10 communicates with the mobile smartphone 200 over Bluetooth, the smartphone preferably transfers crimp information and other tool data using AES-128 bit encryption. When the mobile smartphone 200 uploads this crimp information and other tool data to the web services 210, the smartphone 200 uses AES-256 bit encryption. Additionally, the web services 210 may use a .Net 4.6 framework to communicate with the mobile apps residing on the mobile devices 200 and the web services database 214, as well as any push notifications. The web services based tool management application may utilize HTLML5, CSS, Bootstrap 4, JQuery 3.4.1 to support the user interface with the web services and functions. The web services server uses RDS-MySQL 6.07 database 214, EC2 for web hosting, S3 for FTP, Enabled Apple and Android Push notifications.

Figure 11:
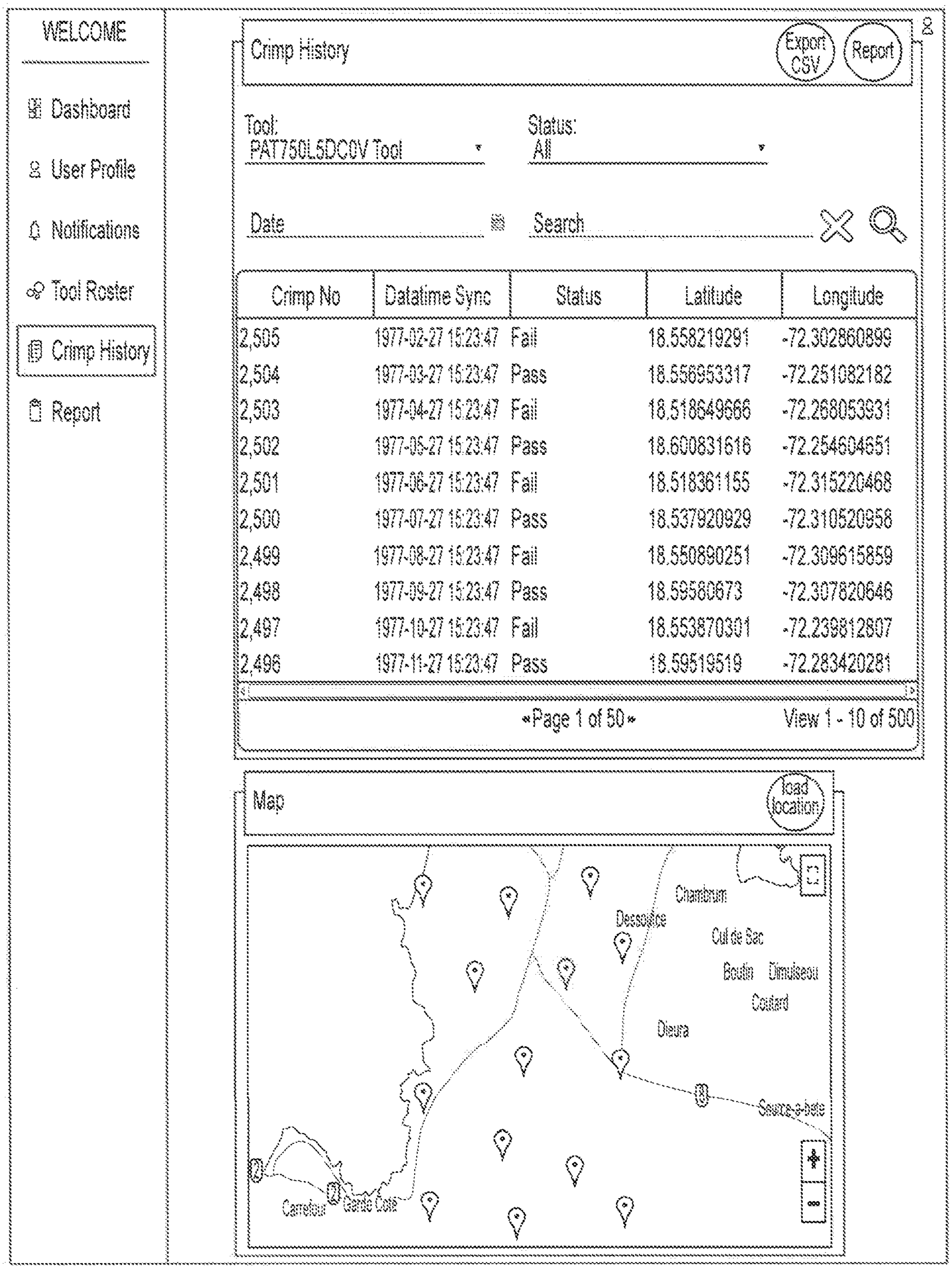
FIG. 11 is a graphic illustration of an external device display according to an exemplary embodiment of the present disclosure.

Referring to FIG. 11, an exemplary page display of an external device, such as a laptop computer 200 connected to the tool management application running on the web services 214 via a browser is shown. In this example, crimp information and other tool data for one or more tools 10 has been transferred into the web services database 214 via, for example, an external device running the mobile app. For example, a vendor of electrical installation services (a tool manager) may have crimp information and other tool data from each of the technicians (a tool user) working on its projects transferred into the web services database 214, or a project manager (a tool manager) for a building site may have crimp information and other tool data from a number of vendors (tool users) transferred into the web services database 214. This crimp information and other tool data may be used to check the quality of the work being performed and to track the progress of the work. The crimp information and other tool data from the web services database 214 may be displayed in a window titled "Crimp History" of a web page loaded into the laptop computer 200 connected to the tool management application running on the web services 214 via a browser. This crimp information and other tool data in the Crimp History may be presented as a table showing an index number for each crimp, e.g., "Crimp No.," a time stamp for each crimp, e.g., a date and time for each crimp, a crimp "Status" identifier showing whether sufficient pressure or force was applied to form the crimp. The crimp Status may be logical value that may be presented as a "Pass" or "Fail" or the crimp Status may be represented as the pressure or force applied to form the crimp, and the location where the crimp was formed, in for example, the latitude and longitude of the tool 10 when the crimp was formed.

Continuing to refer to FIG. 11, a user can filter the crimp information displayed by the laptop computer 200 of the computing system 250 by entering filter criteria. Non-limiting examples of filter criteria include the identity of a particular tool in a "Tool" field, tools with a particular status in a "Status" field, a date crimps were made in a "Date" field, and a user defined alpha-numeric search in a "Search" field. To illustrate, if a user selects or enters a particular tool in the "Tool" field, such as the "PAT750L5DC0V" tool, as seen in FIG. 11, each of the crimp data records of crimp information formed by that tool would be displayed in the Crimp History window. In this exemplary embodiment, the crimp information displayed includes a time stamp, whether the crimp was formed with sufficient force, indicated by a logical Pass or Fail status value, and the location where the crimp was formed. According to one embodiment, the designation whether the Status field of a crimp data record has a Pass or Fail status may be indicated by the color of the typeface (or font) used to display the crimp data record, for example, a green font may be used if the status is Pass and a red font may be used if the Status is Fail. A wide variety of filter criteria can be applied to filter the crimp information stored in the web services database 214 for presentation to the tool manager or the tool user. For example, a tool manager or tool user could query the web services database 214 to show only crimp data records which have a Status of "Fail," or to show crimp data records formed within a date or time range, or to show crimp data records formed within a certain geographic range, and the like. Other display windows (not shown) could be provided to allow a user to enter Boolean logic operators (AND, OR, NOT, etc.) to combine filters using techniques known to those of skill in the relevant field could also be applied.

Figure 12:
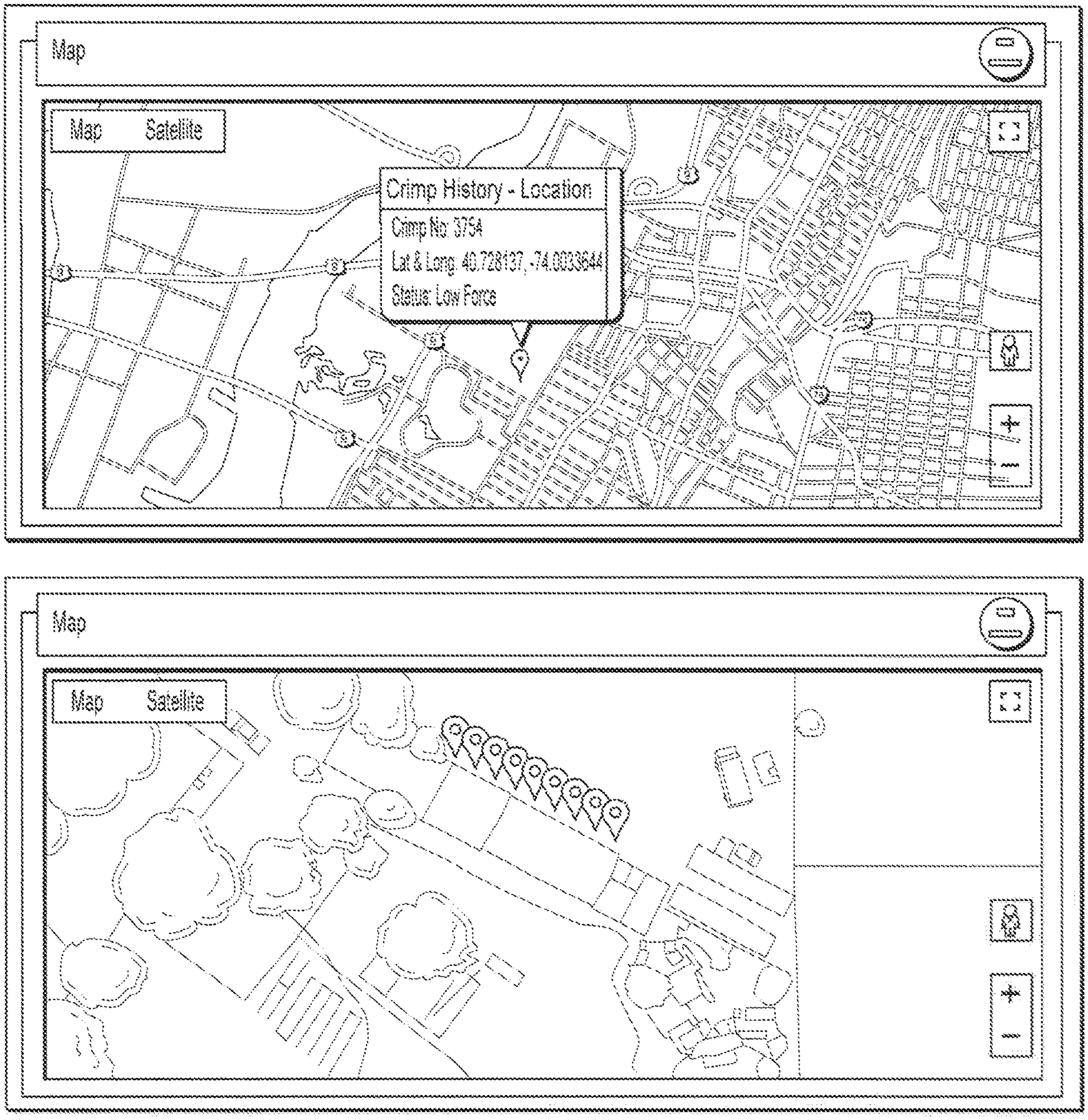
FIG. 12 is another graphic illustration of an external device display according to an exemplary embodiment of the present disclosure.

According to one embodiment, the crimp information retrieved from the web services database 214 based on the selected or entered filter criteria can also be displayed graphically on a map, as seen in FIGS. 11 and 12. In the exemplary embodiment of FIGS. 11 and 12, the location of each of the crimps for tool PAT750L5DC0V (that fit the filter criteria) are overlaid on the map. Icons can be used to display the location of the crimps on the map. The icons may have a typographic designation or color coding, e.g., Green or Red, to show that the particular crimp has a "Pass" or "Fail" status. The map may include landmark information, such as the location and names of towns, streets, power lines, transmission towers, buildings and the like to provide the tool manager or the tool user with information to show the location where crimps or other tool operations were performed. According to one embodiment, the crimp information from multiple crimps and/or other tool operations can be used to track progress on a job site, grounding grids, or other work sites. According to another embodiment, instead of providing a map showing the locations of crimps, the web services 210 can analyze the crimp information to determine a street address of the job site where the crimps where formed. The street address of the crimp could be provided as text.

Figure 13:
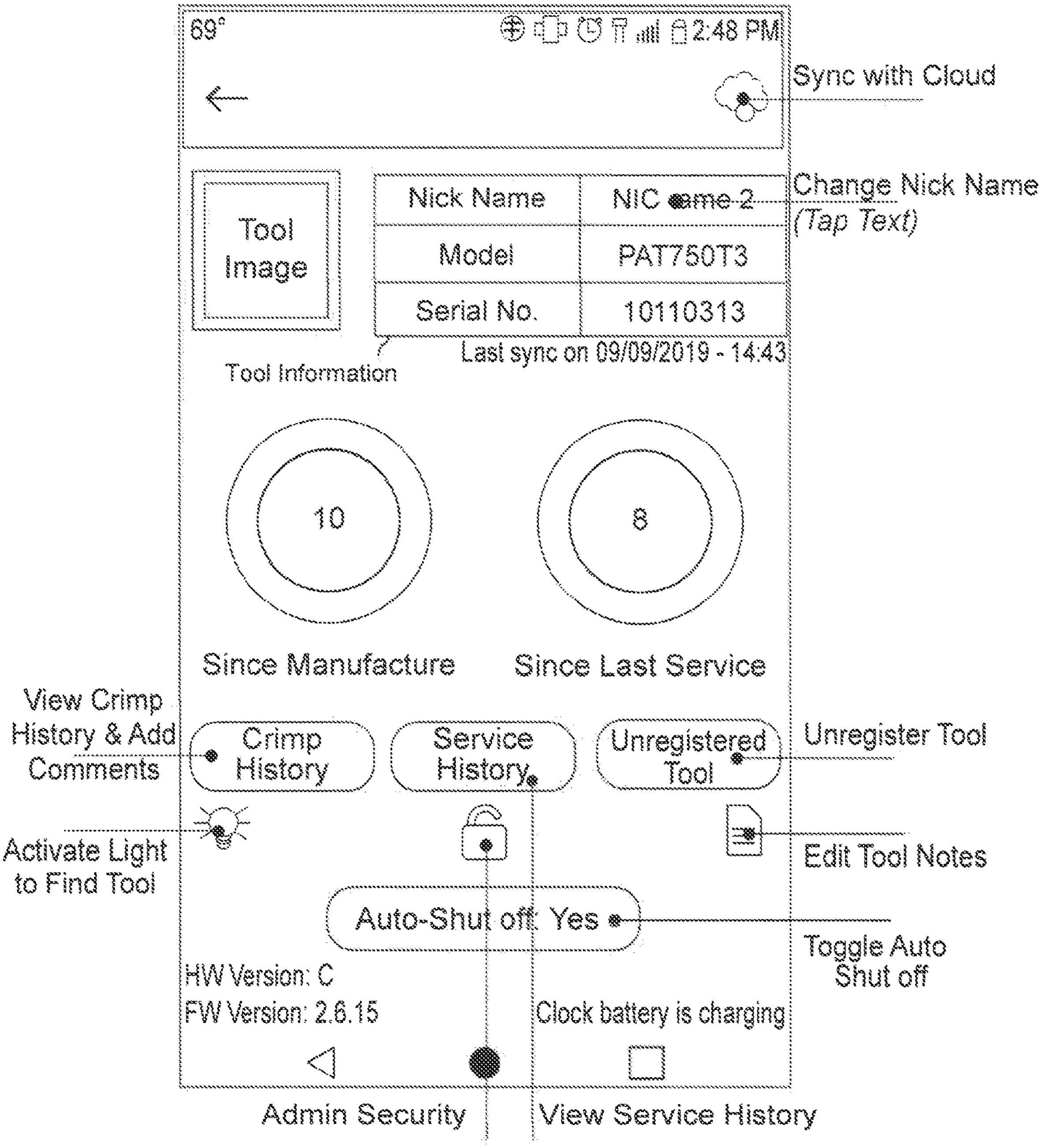
FIG. 13 is an exemplary rendering of a home page of an exemplary embodiment of an app running on an external device forming part of a computing system used to manage the operation of one or more tools according to the present disclosure.
Figure 14:
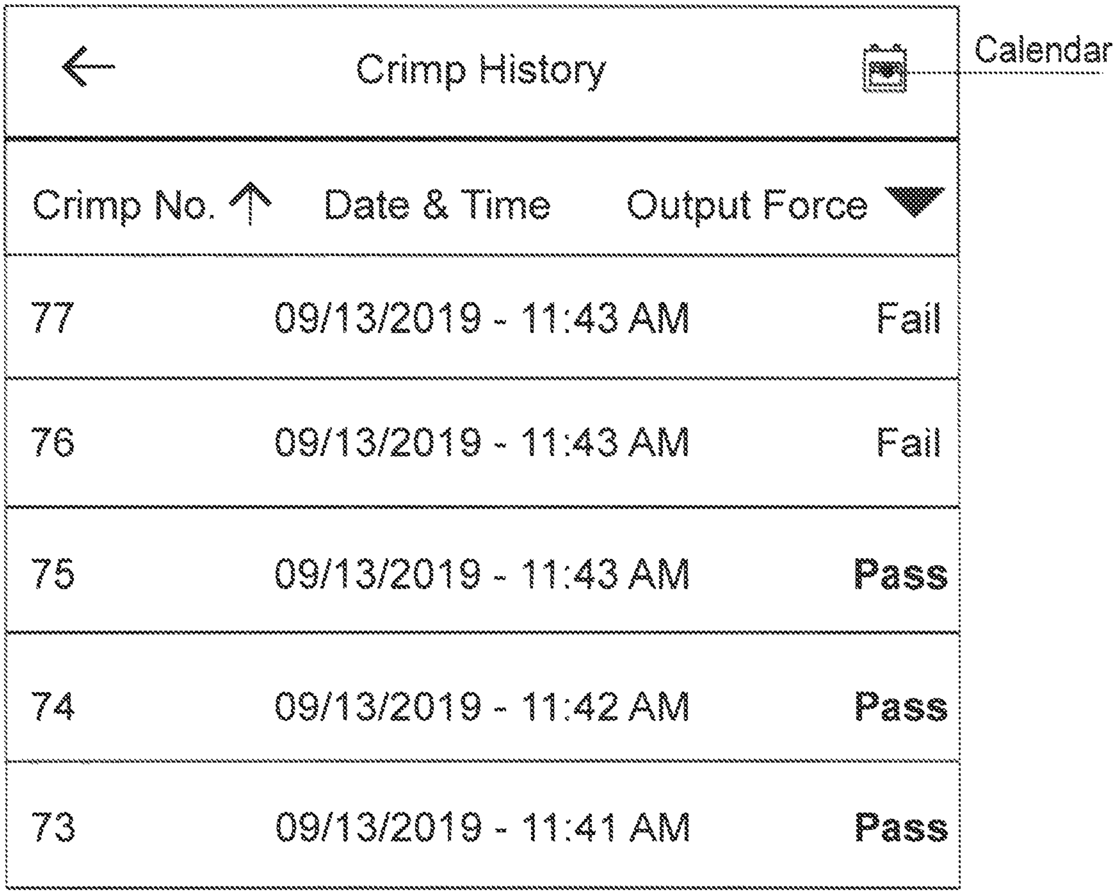
FIG. 14 is an exemplary rendering of a crimp history page of an app running on an external device forming part of a computing system used to manage the operation of one or more tools according to the present disclosure.

Referring now to FIGS. 13-17, the operation of an exemplary embodiment of a mobile app running on a smartphone as an external device 200 will be described. As shown in FIG. 13, after the app is connected to the tool 10, an exemplary tool information page of the app is displayed on the smart phone display. Selecting the "Sync with Cloud" icon initiates a sync operation between the app and the web services 210 of the latest crimp information associated with the tool identified in the "Tool Information" fields. Selecting the "Change Nick Name" field permits the tool manager or tool user to assign an identifier to each unique tool 10 paired with the app and identified in the Tool Information fields. Such identifiers may include, but are not limited, to the user's custom serialization number, the owner of the tool 10, the number of the truck in which the tool 10 is stored. Selecting the "Crimp History" icon displays the page shown in FIG. 12. The crimp history page presents crimp information as a list of crimp data records with an index column "Crimp No.," a time stamp column "Date & Time," and an "Output Force" column. In this exemplary page, the tool manager or the tool user can filter the records by date by selecting the "Calendar" icon to list crimp data records for a particular tool identified in the Tool Information fields, seen in FIG. 13, to display only those crimp data records from the selected date or date range. The column headers, namely the "Crimp No." and the "Output Force" headers, can be selected (e.g., tapped) to toggle between ascending or descending order of crimp numbers, or to filter crimps to those that have an Output Force of Pass, Fail. The Crimp History page may or may not include additional icons to represent the crimp information associated with each crimp data record. For example, and referring to FIG. 16, an icon 216 may be used to represent whether the tool 10 successfully recorded in memory 32 the location where the crimp was formed, an icon 218 used to represent whether or not there are comments saved for a particular crimp data record, or an icon 220 used to represent whether or not the crimp data record includes a flag.

Figure 15:
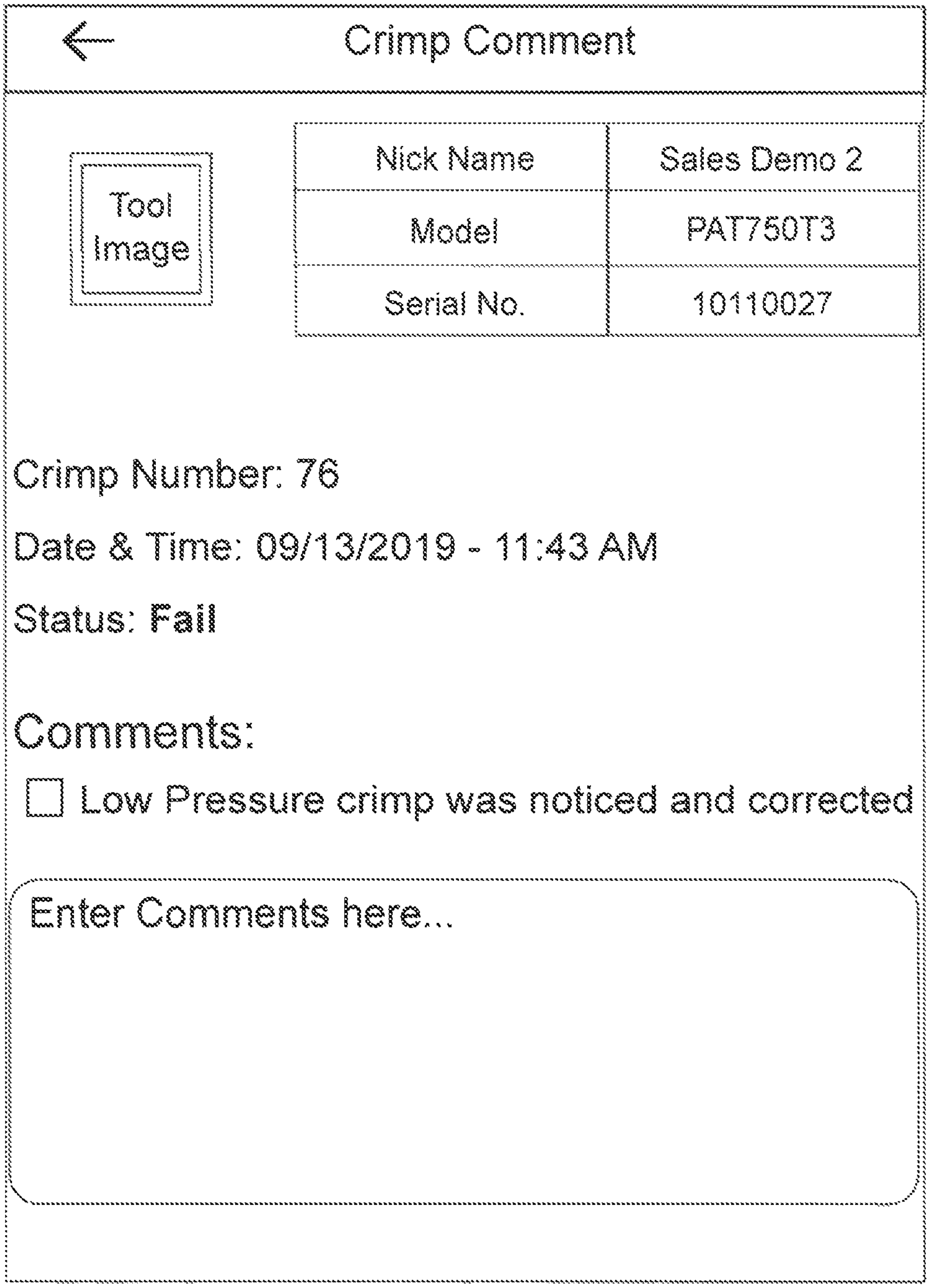
FIG. 15 is an exemplary rendering of a crimp comment page of an app running on an external device forming part of a computing system used to manage the operation of one or more tools according to the present disclosure.
Figure 16:
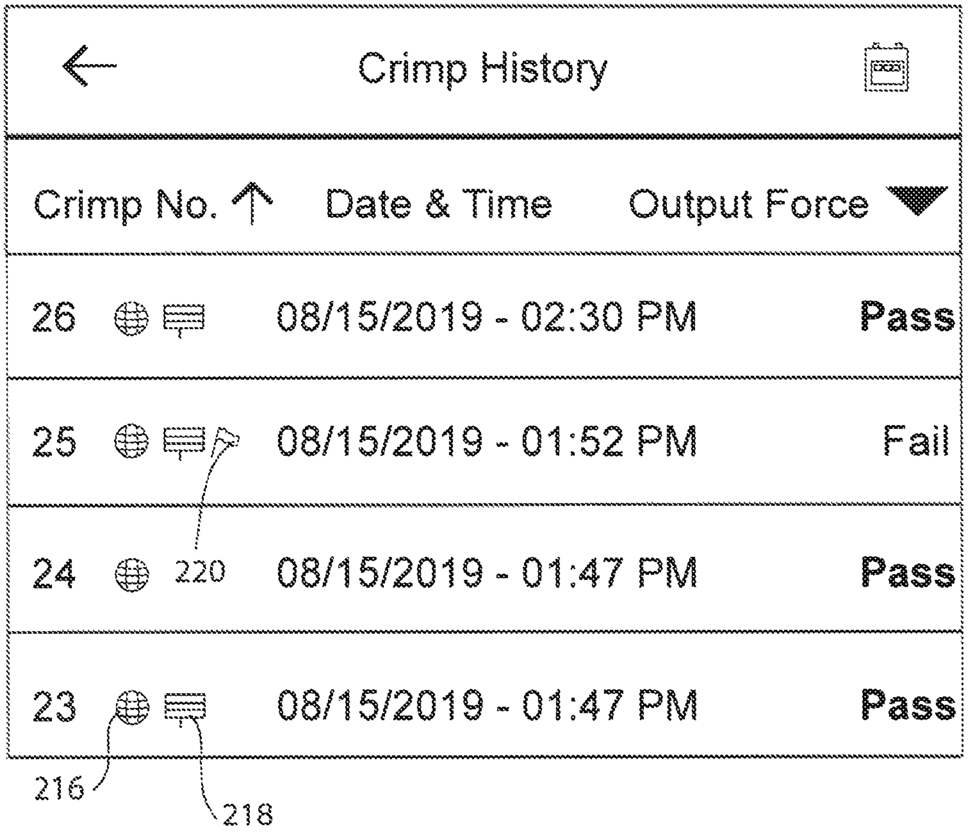
FIG. 16 is another exemplary rendering of a crimp history page of an app running on an external device forming part of a computing system used to manage the operation of one or more tools according to the present disclosure.

If an individual crimp data record, e.g., the Crimp No. 76 row of the crimp information displayed, is selected by the tool manager or tool user, the crimp data record for Crimp No. 76 would be presented on the display of the mobile device, as seen in FIG. 15. From this window, the tool manager or tool user is able to review existing comments associated with the crimp data record or enter new comments about the selected crimp data record. It is noted that these comments can also be reviewed, entered and edited through the laptop computer as an external device 200 running on a browser connected to the tool management application running on the web services 210.

Figure 17:
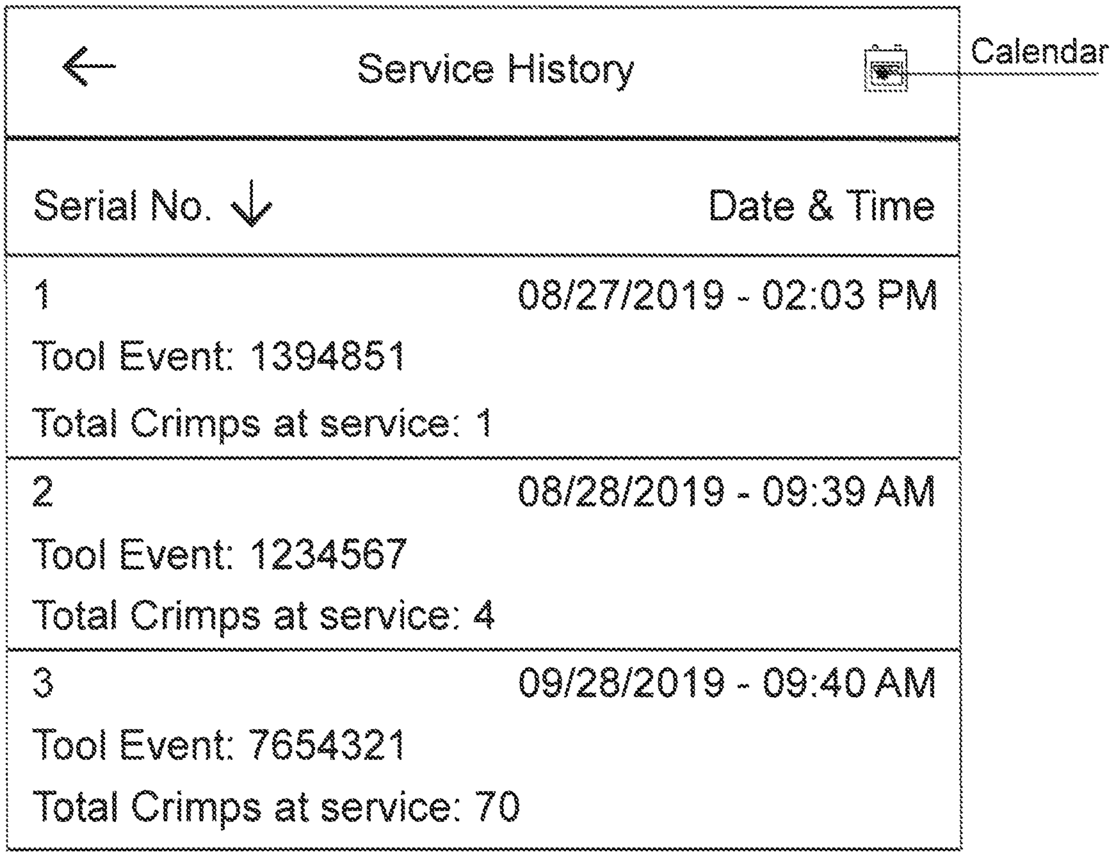
FIG. 17 is an exemplary rendering of a service history page of an app running on an external device forming part of a computing system used to manage the operation of one or more tools according to the present disclosure.

Referring again to FIG. 13, if the tool manager or the tool user selects the "Service History" icon, the page shown in FIG. 17 is displayed. In this exemplary embodiment, the tool manager or the tool user can review, analyze and manage one or more tools 10 using the service history of the one or more tools 10 with service history records stored in the web services database 214. As described above, crimp information about one or more tools may be uploaded to the web services database 214. In addition, service history information associated with the one or more tools may also be added to the web services database 214 using an external device. The crimp information and service history information for each tool may then be used when displaying the Service History. As shown in FIG. 15, each service history data record may include, for example, a unique tool identification number as a "Tool Event," the total number of crimps performed by the specific tool at the time of service as a "Total Crimps as Service," and a time stamp as "Date & Time." Through the Service History page, the tool manager or the tool user can filter service history data records by date by selecting the "Calendar" icon in the top right of the page to display only those service history data records from the selected date. One or more column headers, which in this example the "Service No." headers, can be selected (e.g., tapped) to toggle between ascending or descending service numbers.

Referring again to FIG. 13, if the tool manager or the tool user selects the "Unregister Tool" icon, the tool manager or the tool user can unregister the tool from the users account in the computing system. If the tool manager or the tool user selects the "Activate Light" icon, an instruction is sent from the external device to the tool 10 which is received at the communication port 21 and processed by the controller 24. The controller 24 then activates the work light 26, seen in FIG. 1, causing the work light to illuminate. The work light 26 can illuminate for a continuous period of time or the work light can blink two or more times so that the tool can be located by the tool manager or the tool user. For example, activating the work light 26 as described can be used to easily and quickly determine which tool 10 the external device is connected to, as well as it can assist with locating the tool if it is lost in a dark area. If the tool manager or the tool user selects the "Admin Security" icon, the app running on the external device can toggle between a "secured" operation mode and an "unsecured" operation mode. In the "secured" mode, only the tool manager or the tool user who has registered the tool 10 with the web services 210 or others authorized by the tool manager or the tool user to access the tool manager's or the tool user's account, is able to connect to the tool 10 and view, comment, and/or sync crimp information with the web services 210. In the "unsecured" mode, anyone with an external device running the app can connect to the tool 10 to view, comment and/or sync crimp information with the web services 210. If the tool manager or the tool user selects the "Edit Tool Notes" icon, a text field is presented by the app that allows the user to input alphanumeric comments about the tool 10 identified in the Tool Information fields. This feature supplements the flag comments that may be entered which are focused on particular crimps. The inputted comments could be used to record instances of when the tool was dropped, notes about where and how the tool should be stored, names, dates, or purchasing information. If the tool manager or the tool user selects the "Auto-Shut off" icon, the app running on the external device can toggle between "off" and "on" modes. In the "off" mode, the tool 10 operates such that whenever an operator control, e.g., trigger switches 42 or 44, is activated the motor 18 activates and whenever the operator control, e.g., trigger switches 42 or 44, is deactivated the motor 18 deactivates. In the "on" state, after the operator control is activated so that the motor is activated to begin a crimp cycle, when the controller 24 determines the crimp cycle is complete the controller 24 automatically deactivates the motor 18 to prevent the tool 10 from re-pressurizing after the relief valve 29 has released. This mode reduces energy consumption from the battery 20, reduces the force needed to trigger the return operator control, e.g., trigger switch 42, limits the wear on the tool 10, can initiate a auditory and tactile notification to the tool user the crimp cycle has completed, and can initiate the visual indication from the light 25 as described above.

The app running on the external device may also include "Frozen Timer" and "Job Scheduling" operations. With the Frozen Timer operation, a tool user can specify an amount of time on their account for which the tool can remain unconnected to a paired external device 200 before being deactivated or frozen ("Time-to-Freeze"). This Time-to-Freeze may be entered in units of days, weeks, months or combinations thereof. A page may be presented to the tool user with a field that allows the tool user to input an integer to set the Time-to-Freeze, or the tool user may be presented with preset selections, such as "no time, 1 week, 1 month, or 3 months." When the user's account has a Time-to-Freeze set, whenever a tool 10 connects to an external device, e.g., a mobile device, paired with or logged into the registered account for that tool, the tool 10 will check the current date and determine an end date ("Freeze Date") based on the Time-to-Freeze. For example, if a tool user has set the Time-to-Freeze for 1 week and pairs the app to a tool 10 on October 1$^{st}$, the tool will determine the Freeze Date as October 8$^{th}$. Thereafter, whenever a battery is installed in the tool 10 and an operator switch, e.g., trigger switch 44, is activated, the controller 24 in the tool 10 compares the current date to the Freeze Date. If the current date is after the Freeze Date, which in this exemplary embodiment is after October 8$^{th}$, the tool 10 will be rendered "frozen" so that the controller 24 will not activate the motor 18 in response to the operator control being activated. In some embodiments, the tool 10 may provide the tool user with visual or audible feedback that the tool has been rendered inactive, such as by flashing the LED 25 and/or the work light 26 or by generating a sound. If the tool 10 is in the inactive mode the tool can be returned to the active mode the next time the tool is paired with the external device registered for that tool and syncs the tool's crimp information with the web services database 214, which then set a new Freeze Date.

With the Job Scheduling operation, an operator can upload a file using a mobile application or web browser to the web services database 214 containing information about a job or project that is scheduled to be performed for a particular tool. This file may be in a format such as .txt, .xls, or .csv. In another embodiment, the operator may be able to enter job scheduling details directly into the computing system database using an external device logged into the Tool Application website without uploading a standalone file. The web services 214 functions on the database will parse through the file to determine details about the job to be done and creates a data object with the job details. For ease of description, the data object may also be referred to herein as the Job File. The Job File can be modified. The details of the Job File include but are not limited to: Job Name, Job Location, Employee performing the Job, Expected Start Date, Expected End Date, and List of Tasks, with each Task having a Task Number, Task Name, and an Expected Number of Crimps. The user can then assign this job to a particular tool or tools in the web services database 214. When a user connects to the tool 10 scheduled for the particular job via the communication port 21 an indicator on the display of the external device is rendered or activated indicating that this tool has been assigned a Job. The user can elect to view or start the job. When viewing the job, the user can see all the details stored in the Job File. Once the user elects to start the job, the device records the Actual Start Date and Time to the Job File. The display on the external device then shows a new page or window which may show, for example, a Task Number, a Task Description, the Expected Number of Crimps, and a numeric counter labeled as Crimps Since Task Start. When the user makes the first crimp in a task, the external device will automatically add an alpha-numeric text comment to that crimp indicating that the task has been started, e.g., "[Task Number] [Task Name] started". As the user performs crimps, the Crimps Since Task Start counter increments accordingly. Once the user has completed the task, the user can select a button labeled "Next Task" on the external device 200 to advance the display to show the next Task page or window. Crimps Since Task Start will be recorded to the respective Task in the Job File. The external device 200 automatically adds the comment to the latest crimp "[Task Number] [Task Name] completed." On the external device display, the Task Number, Task Description, Expected Number of Crimps, will be updated to the next sequential task in the Job File, and Crimps Since Task Start will reset to zero. Once the user has advanced to the last task in a Job File, a button labeled "End Job" replaces the button labeled "Next Task" on the external device display. Once "End Job" is selected, the external device records the Actual End Date and Time into the Job File. The external device 200 automatically adds the comment to the latest crimp "[Task Number] [Task Name] and [Job Name] completed." Then the tool 10 returns to normal use. In some embodiments, while in the middle of performing a task, the external device may allow the user to elect to pause a job. Crimps made during the pause are not counted towards the task currently displayed on the external device, but the crimps are added to the tool's crimp history. In addition, the external device automatically sets the flag and adds a comment to any crimps made during this pause such as "Task was paused during this crimp". When the web services 210 generates a report for this tool, the user may select to generate the report for a Job File rather than Start and End Dates. The generated report may show overall information from the Job File, and may determine a score for each task based on the number of crimps made vs the expected number of crimps. The report may also show a normal report output for all the crimps that were made between the Actual Start and End Date and Times.

According to a further embodiment, non-hydraulic mechanical crimping tools may also be equipped to determine, record, and communicate the location of crimps. Still further embodiments of the disclosure encompass tools other than those used to form crimps that are equipped with a location sensor to detect and record a location where the tool is used. These tools may include other hydraulic tools and non-hydraulic tools. Such tools might include welders, cutting tools, grinders, drills, and the like. According to one embodiment, geographic location information from these tools is also provided to the computing system and stored in the database. According to this embodiment, filtering criteria may be applied to show when and where these tools are used.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A tool comprising:

a tool frame;

an actuator disposed on the tool frame;

a working surface adapted to shape a workpiece when the working surface is moved in a working direction relative to the tool frame, wherein the actuator is connected with the working surface and adapted to drive the working surface in the working direction in response to an activation signal;

a flag switch selectively activatable by a tool user;

a force sensor adapted to measure a force applied by the working surface on the workpiece;

a location detector connected with the tool frame to determine a geographic location of the tool;

a memory; and a programmed processor comprising a clock and connected with the memory, the actuator, the flag switch, the force sensor, and the location detector, the programmed processer programmed with code such that in response to each activation signal, the processor, causes the actuator to move the working surface in the working direction, monitors the force sensor for force information and the location detector for location information, and creates an activation data record for each activation signal by recording in the memory the force information, the location information, a flag if the flag switch was activated by the tool user and clock information indicating a date and time the activation signal occurred regardless of a distance of the tool from a data processing system to which the data record is to be transferred.

2. The tool according to claim 1, wherein the actuator comprises a piston connected with the working surface and a hydraulic system in fluid communication with the piston, wherein the force sensor comprises a pressure sensor in fluid communication with the hydraulic system, and wherein the processor monitors a signal from the pressure sensor to determine the force.

3. The tool of claim 1, wherein the working surface comprises a crimping surface and the workpiece comprises an electrical crimp connector and a conductor.

4. The tool of claim 1, wherein the location sensor comprises a global navigation satellite system (GNSS) receiver.

5. The tool of claim 4, wherein the GNSS comprises an antenna module positioned near a surface of the tool frame to receive radio frequency signals from one or more of Global Positioning System (GPS), Next Generation Operational Control System (OCX), Global Navigation Satellite System (GLONASS), BeiDou Navigation Satellite System (BNS), Quasi-Zenith Satellite System (QZSS), Galileo Positioning System operated by the European Union, and India Regional Navigation Satellite System (NAVIC).

6. The tool of claim 2, wherein the force comprises a maximum force applied during the movement of the working surface.

7. The tool of claim 6, wherein the force comprises a series of forces applied by the working surface on the workpiece during the movement of the working surface.

8. The tool of claim 1, wherein the location detector generates a signal comprising location information, wherein the location information comprises one or more of a latitude, a longitude and an altitude.

9. The tool of claim 8, wherein the one or more of the latitude, the longitude and altitude corresponds to one or more of a location and a floor of a building at which the tool is located when the location is recorded in the memory.

10. The tool of claim 1, wherein the force and location are stored as a data record in the memory and wherein a plurality of such data records are stored in the memory, wherein the tool further comprising a data processing system in signal communication with the memory, and wherein the plurality of records is transferred from the memory to the data processing system.

11. The tool of claim 10, wherein the data processing system comprises a filter for applying one or more criteria to select one or more of the records and a display to display the selected records.

12. The tool of claim 11, wherein the display displays a map and wherein a graphic representation of the selected record is displayed on the map.

13. The tool of claim 11, wherein the data processing system processes the location information to determine a street address based on the data records.

14. A tool comprising:

a tool frame;

an actuator disposed on the tool frame;

a working surface adapted to shape a workpiece when the working surface is moved in a working direction relative to the tool frame, wherein the actuator is connected with the working surface and adapted to drive the working surface in the working direction in response to an activation signal;

a flag switch selectively activatable by a tool user;

a force sensor adapted to measure a force applied by the working surface on the workpiece;

a location detector connected with the tool frame to determine a geographic location of the tool;

a memory; and a programmed processor comprising a clock and connected with the memory, the actuator, the flag switch, the force sensor, and the location detector, the programmed processer programmed with code such that in response to each activation signal, the processor, causes the actuator to move the working surface in the working direction, monitors the force sensor for force information and the location detector for location information indicating the geographic location of the tool at the time of each activation signal, and creates an activation data record for each activation signal by recording in the memory the force information, the location information, a flag if the flag switch was activated by the tool user and clock information indicating a date and time the activation signal occurred.

* * * * *